(12) United States Patent
Lewison et al.

(10) Patent No.: US 10,567,377 B2
(45) Date of Patent: Feb. 18, 2020

(54) MULTIFACTOR PRIVACY-ENHANCED REMOTE IDENTIFICATION USING A RICH CREDENTIAL

(71) Applicants: Karen Pomian Lewison, Carmichael, CA (US); Francisco Corella, Carmichael, CA (US)

(72) Inventors: Karen Pomian Lewison, Carmichael, CA (US); Francisco Corella, Carmichael, CA (US)

(73) Assignee: Pemian & Corella, LLC, Carmichael, CA (US)

( * ) Notice: Subject to any disclaimer, the term of this patent is extended or adjusted under 35 U.S.C. 154(b) by 270 days.

(21) Appl. No.: 15/468,100

(22) Filed: Mar. 23, 2017

(65) Prior Publication Data

US 2017/0339138 A1 Nov. 23, 2017

Related U.S. Application Data

(60) Provisional application No. 62/408,774, filed on Oct. 15, 2016, provisional application No. 62/364,239, (Continued)

(51) Int. Cl.
*H04L 29/06* (2006.01)
*H04L 9/32* (2006.01)

(52) U.S. Cl.
CPC ........ *H04L 63/0861* (2013.01); *H04L 9/3239* (2013.01); *H04L 9/3268* (2013.01);
(Continued)

(58) Field of Classification Search
CPC ..... H04L 9/321; H04L 61/1511; G06Q 20/40; G06F 21/31
(Continued)

(56) References Cited

U.S. PATENT DOCUMENTS 6,202,151 B1 3/2001 Musgrave et al.
6,310,966 B1 10/2001 Dulude et al.
(Continued)

OTHER PUBLICATIONS

Internet Engineering Task Force (IETF), D. Cooper et al., Internet X.509 Public Key Infrastructure Certificate and Certificate Revocation List (CRL) Profile, May 2008, published online at https://www.ietf.org/rfc/rfc5280.txt.
(Continued)

*Primary Examiner* — Bryan F Wright

(57) ABSTRACT

A method and system are provided for multifactor identification of a subject over a network using a rich credential, with selective disclosure of attributes and selective presentation of verification factors. A credential presentation application negotiates with a verifying server to agree on attributes to be disclosed and verification factors to be presented, and removes unneeded attributes and verification data from the rich credential by pruning subtrees from a typed hash tree without invalidating a signature that covers the root label of the tree. The credential presentation application proves knowledge of a private key, and as agreed upon may prove knowledge of a password and may arrange for biometric presentation applications to present one or more biometric samples to the verifier, which performs presentation attack detection and verifies the samples against verification data in the rich credential.

8 Claims, 15 Drawing Sheets

Related U.S. Application Data filed on Jul. 19, 2016, provisional application No. 62/340,395, filed on May 23, 2016.

(52) U.S. Cl.
CPC ........ H04L 63/083 (2013.01); H04L 63/0823 (2013.01); H04L 63/126 (2013.01); H04L 63/205 (2013.01); *H04L 2463/082* (2013.01)

(58) Field of Classification Search
USPC .......................................................... 713/156
See application file for complete search history.

(56) References Cited

U.S. PATENT DOCUMENTS

| | | | |
|---|---|---|---|
| 6,802,002 | B1 | 10/2004 | Corella |
| 8,527,777 | B2 | 9/2013 | Camenisch et al. |
| 8,966,276 | B2* | 2/2015 | Nanopoulos ............ G06F 21/31 713/183 |
| 9,031,231 | B2* | 5/2015 | Asim ...................... G06F 21/32 380/44 |
| 9,495,588 | B2 | 11/2016 | Derakhshani et al. |
| 2002/0078344 | A1* | 6/2002 | Sandhu ................... H04L 9/321 713/155 |
| 2016/0065570 | A1* | 3/2016 | Spencer, III .......... G06Q 20/40 726/7 |
| 2017/0272250 | A1* | 9/2017 | Kaliski, Jr. ......... H04L 61/1511 |

OTHER PUBLICATIONS

Springer International Publishing Switzerland, Hasini Gunasinghe et al.., Privacy Preserving Biometrics-Based and User Centric Authentication Protocol, in M.H. Au et al. (Eds.): NSS 2014, LNCS 8792, pp. 389-408, 2014.

Rathgeb, C. & Uhl, A. "A Survey on Biometric Cryptosystems and Cancelable Biometrics". EURASIP Journal on Information. Security (2011) 2011:3. Springer. See Section 2: Biometric Cryptosystems.

Anil K. Jain, Karthik Nandakumar and Abhishek Nagar, "Biometric Template Security". EURASIP Journal on Advances in Signal Processing, vol. 2008, Jan. 2008, Article 113. Hindawi Publishing Corporation. See paragraphs on biometric cryptosystems in Section 3.

Feng Hao, Ross Anderson and John Daugman, "Combining Cryptography with Biometrics Effectively". Technical Report No. 640, Computer Laboratory, University of Cambridge.

\* cited by examiner

MULTIFACTOR PRIVACY-ENHANCED REMOTE IDENTIFICATION USING A RICH CREDENTIAL

CROSS-REFERENCE TO RELATED APPLICATIONS

The subject matter of this application is related to the subject matter of U.S. Provisional Patent Application No. 62/340,395 (filed on May 23, 2016), No. 62/364,239 (filed on Jul. 19, 2016) and No. 62/408,774 (filed on Oct. 15, 2016), priority to which is claimed under 35 U.S.C. § 119(e) and which are incorporated herein by reference.

GOVERNMENT SUPPORT

This invention was made with Government support under the SBIR Phase I Contract No. HSHQD-16-C-00052 awarded by the Department of Homeland Security. The Government has certain rights in this invention.

BACKGROUND

As more and more transactions with high security and privacy requirements are executed over the Internet, there is a need for an effective means of identifying remote transaction participants. In a commonly used method of remote identification, a verifier asks a subject questions that require the knowledge of personal information to be answered correctly. However this method has become ineffective as more and more personal information is available to impostors on social networks and on black markets where hackers sell information obtained through database security breaches.

Federated identity protocols allow a relying party to obtain information about a subject from an identity provider by redirecting the subject's web browser to the identity provider, which authenticates the subject and redirects the browser back to the relying party, passing identity information. Social networks such as Facebook and Twitter, and email service providers such as Google and Yahoo routinely serve as identity providers to enable third-party login to web sites. Such third-party login providers have large data centers with many thousands of servers that enable them to support a large number of login transactions per second, but they are not authoritative sources of the kind of identifying information needed to enable transactions with high security and privacy requirements. On the other hand, authoritative identity sources such as a Department of Motor Vehicles, a certification authority, a financial institution that has performed know-your-customer due diligence, or a health-care provider that has vetted its doctors and nurses will not typically have the computing resources needed to participate in large numbers of identification events as federated identity providers. Furthermore, by being actively involved in a subject's identification events, federated identity providers gain knowledge of the parties that the subject interacts with, and of the timing of the transactions that require identification. This impinges on the subject's privacy, especially so in the case of privacy-sensitive transactions.

Identification by means of a traditional cryptographic credential such as an X.509 certificate does not have the above drawbacks of federated identity protocols because the cryptographic credential issuer is not involved in the presentation of the credential by the subject to the verifier. However an X.509 certificate provides only one identity verification factor, viz. proof of possession of the private key associated with the public key that the certificate binds to attributes of the subject.

Identification of a remote participant in a security-sensitive transaction requires multiple verification factors, preferably including something that the subject has (a computing device containing a private key), something that the subject knows (a password), and something that the user "is" (a biometric feature of the subject). If a biometric sample is used as a verification factor, it must be presented directly to the verifier, rather than to a computing device controlled by the subject such as a smart phone, so that the verifier can perform presentation attack detection (a.k.a. spoofing detection), including liveness verification and replay detection, on the presentation of the sample. And identification of a remote participant in a privacy-sensitive transaction requires selective disclosure of attributes and selective presentation of verification factors, so that the subject is able to only present those attributes and verification factors that each particular verifier needs to identity the subject for each particular transaction. No existing method of remote identification comes close to satisfying all these requirements.

Therefore there is a need for better methods of identifying participants in Internet transactions with high security and privacy requirements.

SUMMARY

In one embodiment, a subject participating in an Internet transaction is identified by a verifying server using a rich credential issued by an issuing server operated by a certification authority.

The rich credential comprises a secret portion and a disclosable portion, the secret portion comprising a private key and a secret salt, the disclosable portion comprising a rich certificate, the rich certificate comprising a typed hash tree containing a plurality of attributes of the subject and verification data supporting the presentation of a plurality of verification factors.

A credential presentation application negotiates with the verifying server in order to agree on which of the attributes are to be disclosed and which of the verification factors are to be presented to identify the subject.

The credential presentation application transitions a copy of the rich certificate from a storage state to a presentation state, the resulting presentation-state copy containing the agreed upon attributes and verification data supporting presentation of the agreed upon verification factors, but omitting other attributes and other verification data. Transitioning the rich certificate to the storage state includes pruning subtrees from the typed hash tree without invalidating a signature computed by the issuing server on the public key associated with the private key, metadata, and the root label of the typed hash tree. If knowledge of a password is one of the agreed upon verification factors, the credential presentation application obtains the password from the subject and includes a cryptographic hash of the password and the secret salt in the presentation-state copy of the rich certificate.

The credential presentation application sends the presentation-state copy of the rich certificate to the verifying server over a network.

If a biometric verification factor has been agreed upon, a biometric presentation application running on the same device as the credential presentation application or on a separate device transmits a biometric sample to the verifier in a manner that allows the verifier to perform presentation attack detection.

The verifying server verifies the agreed upon verification factors against the verification data received from the credential presentation application as part of the presentation-state copy of the rich certificate, including a proof of knowledge of the private key present in the secret portion of the rich credential, and possibly including a proof of knowledge of the password and verification of one or more biometric samples.

BRIEF DESCRIPTION OF THE DRAWINGS

The accompanying drawings are included to provide a further understanding of embodiments and are incorporated in and constitute a part of this specification. The drawings illustrate embodiments and together with the description serve to explain principles of embodiments. Other embodiments and many of the intended advantages of embodiments will be readily appreciated as they become better understood by reference to the following detailed description. Reference numerals consist of a concatenation of a one- or two-digit number referring to a figure, followed by a two-digit number that locates the referenced part within the figure. A reference numeral introduced in a figure may be used in other figures to refer to the same part or a similar part.

DETAILED DESCRIPTION

This Detailed Description refers to the accompanying drawings, which are a part hereof and illustrate examples of embodiments of the invention. It is to be understood that other embodiments are possible, and that the features of different exemplary embodiments can be combined together unless otherwise stated.

A "rich credential" is defined herein as a cryptographic credential that asserts multiple attributes of a subject and contains verification data supporting multiple verification factors, and can be presented to a verifier while only disclosing a selected subset of the asserted attributes and only presenting a selected subset of the supported verification factors.

"Identifying a subject" is meant herein in a broad sense, as ascertaining that the subjects possesses one or more attributes that may uniquely determine the subject or, more broadly, may determine that the subject is a member of a class. For example, a single birthdate attribute may be used to identify the subject as being a member of a class of customers that are old enough to purchase wine.

Figure 1:
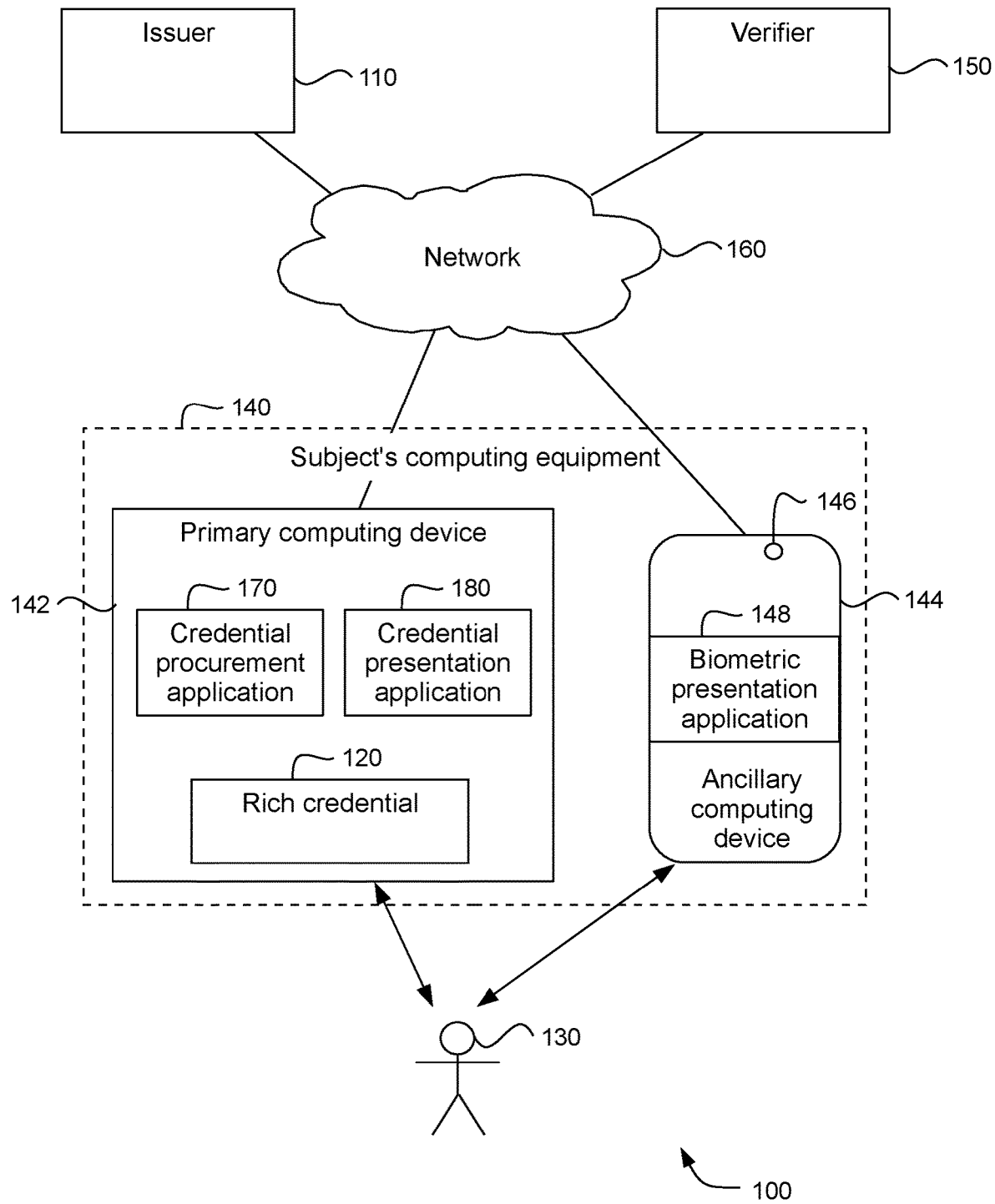
FIG. 1 is a block diagram illustrating a system for multifactor privacy-enhanced remote identification, according to some embodiments.

FIG. 1 is a block diagram generally illustrating a system 100 for multifactor privacy-enhanced remote identification by means of a rich credential.

The system 100 comprises an issuer 110 that issues a rich credential 120 to a human subject 130 that operates computing equipment 140 where the rich credential is stored for subsequent presentation to a verifier 150. The issuer is a server (defined herein as a computer providing services over a network) operated by a certification authority (CA) (henceforth, "the issuing CA"). The verifier is a server operated by a party that relies on the rich credential to identify the subject (henceforth, "the relying party"). The issuer, the verifier and the computing equipment are connected to a network 160 such as the Internet.

In some embodiments the computing equipment comprises a primary computing device 142 such as a desktop or laptop computer, and an ancillary computing device 144 such as a smart phone, both connected to the network 160. The ancillary computing device is equipped with one or more sensors such as a camera 146 and one or more biometric presentation applications 148 capable of obtaining data from the sensors, such as a live video application capable of obtaining live video from the camera and transmitting it over the Internet.

A credential procurement application 170 runs on the primary computing device at credential-issuance time and interacts with the subject and the issuer to procure the rich credential. A credential presentation application 180 runs on the primary computing device at credential presentation time and interacts with the subject and the verifier in order to present the rich credential to the verifier, proving knowledge of a private key, proving that the subject knows a password, and arranging for one or more biometric presentation applications running on the ancillary device, such as the live video application, to submit one or more biometric samples to the verifier as biometric verification factors in a manner that facilitates presentation attack detection by the verifier, such as a live video of the subject's face reading prompted text, which the verifier verifies against biometric verification data included in the credential such as a facial image of the subject.

In some embodiments the rich credential is stored in a pluggable device that has its own processor. Examples of such a pluggable device included a Universal Serial Bus (USB) dongle plugged into the primary computing device and a smart card plugged into a smart card reader connected to the primary computing device. In such embodiments the pluggable device will herein be considered to be part of the primary computing device, and the credential procurement and presentation applications will be considered to encompass code that runs on the processor of the pluggable device in addition to code that runs on one or more Central Processing Units (CPUs) and/or Graphical Processing Units (GPUs) of the primary computing device, those applications thus being distributed computer programs.

Figure 2:
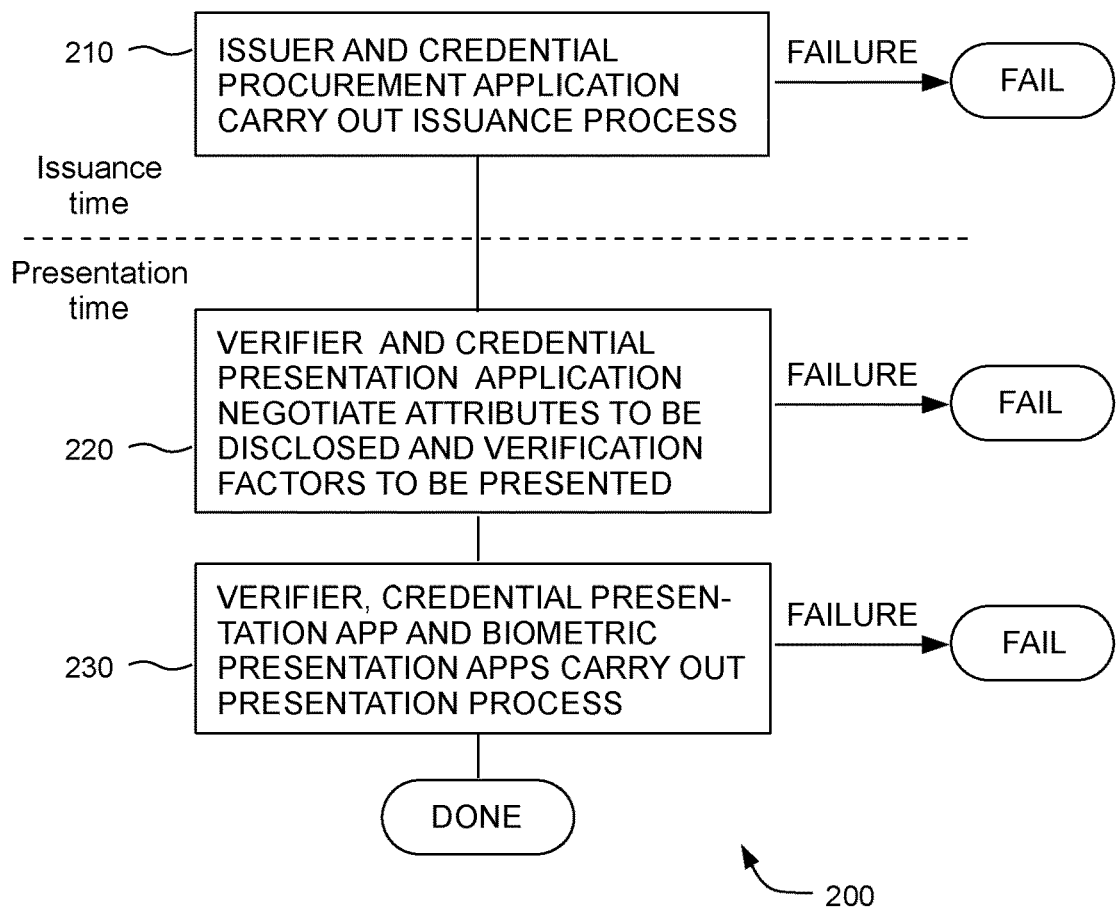
FIG. 2 is a flow diagram illustrating a process for multifactor privacy-enhanced remote identification, according to some embodiments.

FIG. 2 is a flow diagram illustrating a process 200 for multifactor privacy-enhanced remote identification, according to some embodiments.

At 210 the issuer 110 and the credential procurement application 170 running on the primary computing device 142 jointly carry out an issuance process, shown below in FIG. 14, which may succeed or fail. If the issuance process fails, process 200 fails. If the issuance process succeeds, it results in the rich credential 120 being issued by the issuer to the subject and stored by the procurement application in the primary computing device 142, and process 200 then continues at 220, which takes place at a later presentation time when the relying party that operates verifier 150 requires identification by the subject with the rich credential in order to authorize a transaction.

At 220 the verifier and the credential presentation application 180 running on the primary computing device jointly carry out a negotiation process, shown below in FIG. 15, to agree on which of the attributes are to be disclosed and which of the verification factors are to be presented for identification of the subject. The negotiation process may succeed or fail. If it fails, process 200 fails. If it succeeds, process 200 continues at 230.

At 230 the verifier, the credential presentation application running on the primary computing device, and one or more biometric presentation applications running on the ancillary computing device 144 jointly carry out a presentation process, shown below in FIG. 16, in which the rich credential is presented to the verifier, with disclosure of the attributes and presentation of the verification factors agreed upon at 220. The presentation process may succeed or fail. If it fails, process 200 fails. If it succeeds, process 200 terminates successfully.

Figure 3:
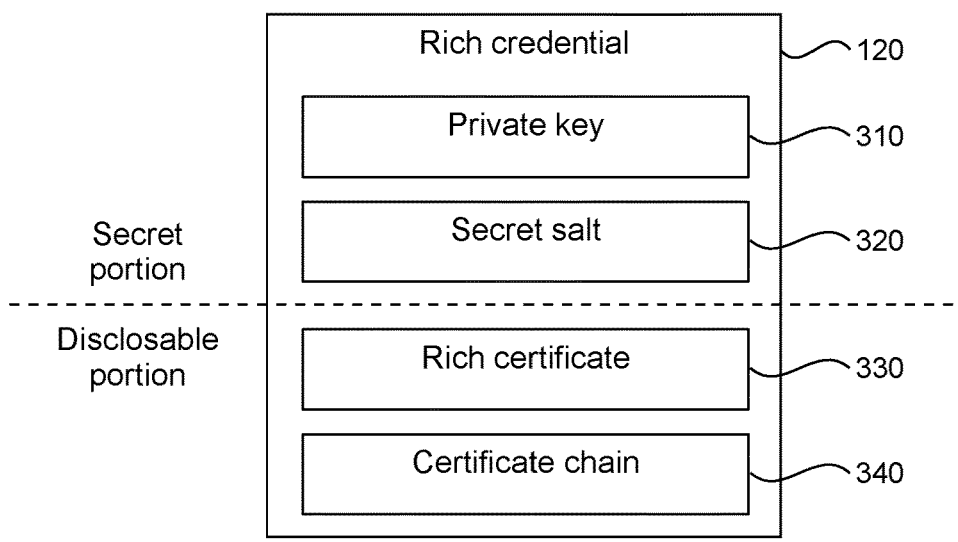
FIG. 3 is a block diagram illustrating the components of a rich credential.

FIG. 3 is a block diagram illustrating the components of rich credential 120 according to some embodiments. The rich credential has a secret portion, which comprises a private key 310 and a secret salt 320, and a disclosable portion, which comprises a rich certificate 330 and a CA certificate chain 340.

The term "salt" is often used to refer to a non-secret random value that is hashed with a password to mitigate a dictionary attack against a password database; but it is also used in cryptography and is used herein in a broader sense, to refer to random values that are hashed with passwords or other values for various purposes. The term "random" is used herein to refer to both random and pseudo-random values.

In some embodiments the secret salt 320 is cryptographically hashed with a password chosen by the subject 130 for use in conjunction with the rich credential 120 (henceforth, "the credential password") in a manner specified by a specification that more generally defines the format and usage of the rich credential (henceforth, "the rich credential specification"), the resulting cryptographic hash being henceforth called "the hash of the credential password and the secret salt (HoCPaSS)".

Figure 4:
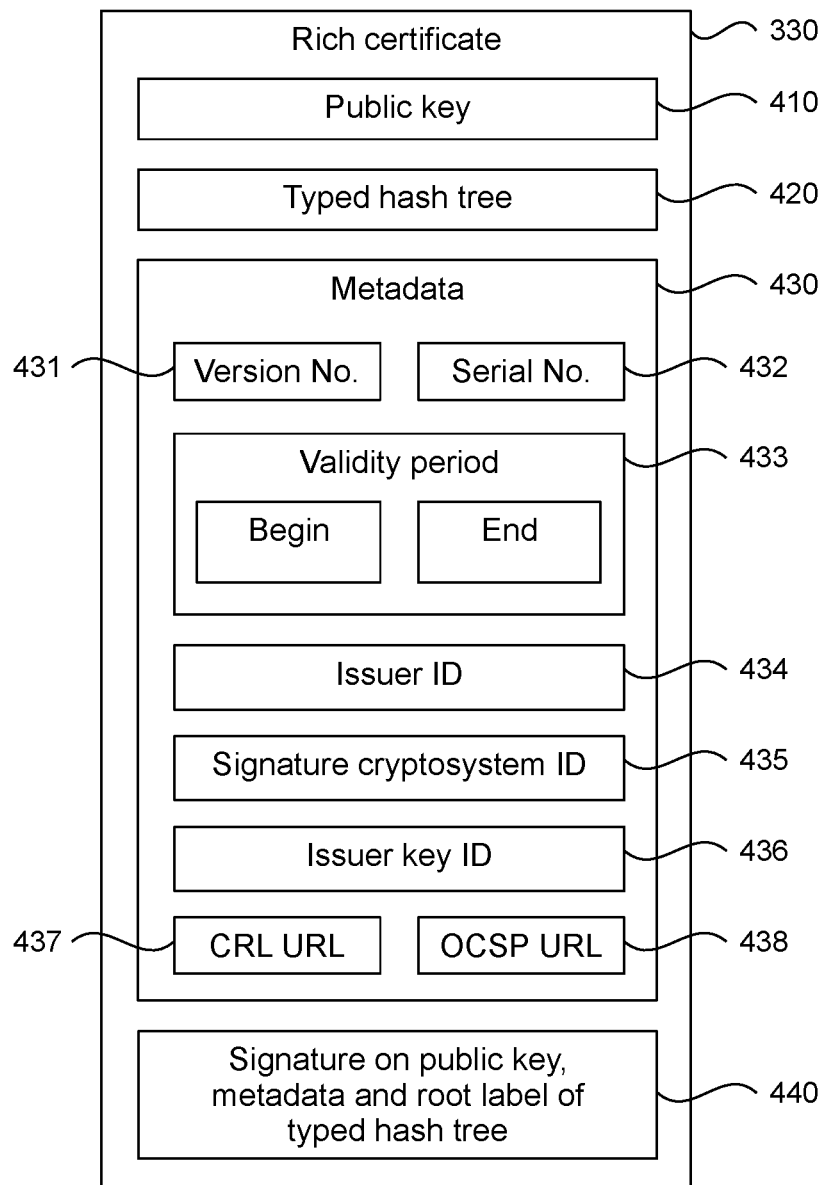
FIG. 4 is a block diagram illustrating the components of a rich certificate.

FIG. 4 is a block diagram illustrating the components of the rich certificate 330 according to some embodiments. The rich certificate comprises a public key 410, a typed hash tree 420, metadata 430, and a signature 440.

The public key 410 and the private key 310 of FIG. 3 constitute a key pair pertaining to a digital signature public key cryptosystem such as the Digital Signature Algorithm (DSA), the Elliptic Curve Digital Signature Algorithm (ECDSA) or the Rivest Shamir Adleman (RSA) cryptosystem, all described in the Federal Information Processing Standard FIPS PUB 186-4 of the National Institute of Standards and Technology (NIST) and publications referenced therein. Other kinds of public key cryptosystems are used in alternative embodiments.

The typed hash tree 420 is a data structure that contains subject attributes and verification data and has a root label that serves as an omission-tolerant cryptographic checksum of the attributes and verification data, as described below in connection with FIGS. 5-13.

The metadata 430 is similar to the metadata that is present in an ordinary X.509 public key certificate. It comprises a version number 431, a rich certificate serial number 432, a validity period 433 defined by begin and end times, an issuer ID 434 identifying the CA that operates the issuer 110 that has issued the certificate, a signature cryptosystem ID 435, an issuer key ID 436, a Uniform Resource Locator (URL) 437 of a Certificate Revocation List (CRL) distribution point, and a URL 438 of on Online Certificate Status Protocol (OCSP) server. The version number refers to the particular version of the rich credential specification used to construct the rich certificate 330.

The signature 440 is applied to the public key 410, the root label of the typed hash tree 420, and the metadata 430 encoded as specified by the credential specification. It is computed by the issuer 110 using a private key pertaining to a digital signature cryptosystem such as DSA, ECDSA or RSA identified by the signature cryptosystem ID, and verified by the verifier 150 using the associated public key, which the verifier identifies by means of the issuer key ID 436.

Figure 5:
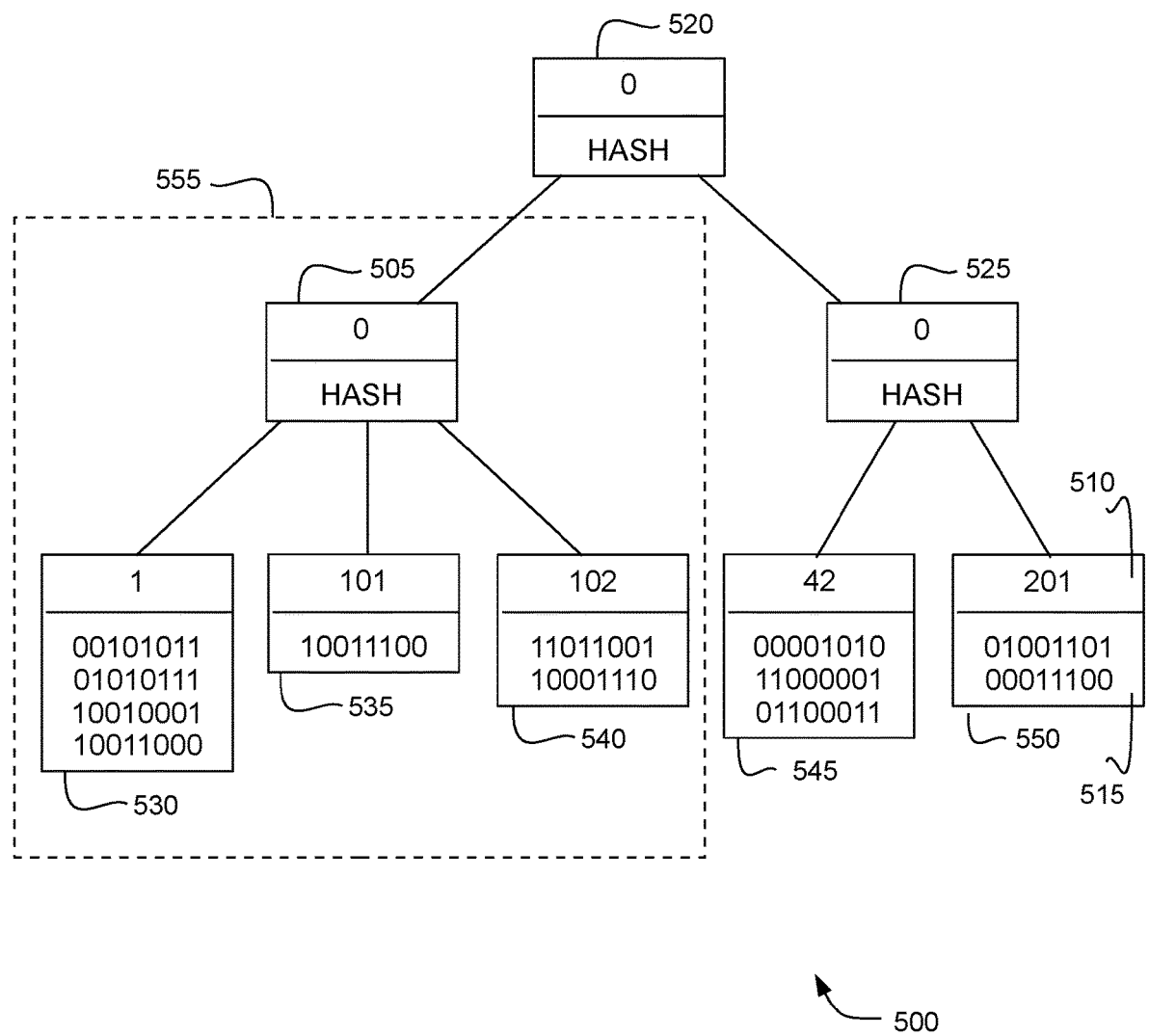
FIG. 5 is a block diagram generally illustrating a typed hash tree.

FIG. 5 is a block diagram illustrating an exemplary typed hash tree 500 according to some embodiments. Every node in a typed hash tree has a type and a label. In the example, a node is shown as a split box with the type in the top portion of the box and the label in the bottom portion. For example, the type of node 550, shown as "201" in the figure, is in the top portion 510 of the split box that illustrates the node, while its label, shown as "0100110100011100" in the figure, is in the bottom portion 515. Leaf nodes are nodes without children, internal nodes are nodes with children and the root node is the node without a parent. In the example of FIG. 5, nodes 505, 520 and 525 are internal nodes, nodes 530, 535, 540, 545 and 550 are leaf nodes and node 520 is the root node.

Node types are defined by the credential specification. There is a distinguished type, which is shared by all the internal nodes and may also be the type of some leaf nodes. In the example of FIG. 5, types are numeric, shown in decimal representation, and the distinguished type is 0; other types shown in the figure are mere examples.

Node labels are bit strings. The label of a leaf node is encoded as a bit string according to the type of the node in a manner specified by the credential specification. The labels shown in FIG. 5 are mere examples. The label of an internal node is a hash computed by applying a cryptographic hash function such as SHA-256, to a one-to-one encoding of the types and labels of its children, as indicated by the word HASH in the figure. An example of a one-to-one encoding is Abstract Syntax Notation One Distinguished Encoding Rules (ASN.1 DER). The particular cryptographic hash function and the particular one-to-one encoding used in the computation of the label of an internal node are determined by the credential specification.

The "root label" of the typed hash tree is the label of the root node.

Each node of the typed hash tree determines a subtree rooted at that node, which contains the node, and its descendants if any. For example, the subtree rooted at node 505 is the typed hash subtree 555 indicated by a dashed box in the figure, which contains node 505 and its descendants, in this case its children, nodes 530, 535 and 540.

A "peripheral node" is a node whose type is the distinguished type and all of whose children, if any, are leaf nodes. A "peripheral subtree" is a subtree rooted at a peripheral node. For example, node 505 is a peripheral node, and subtree 555 is a peripheral subtree. A "connecting node" is a node that is neither the root node of the tree nor a node of a peripheral subtree.

Figure 6:
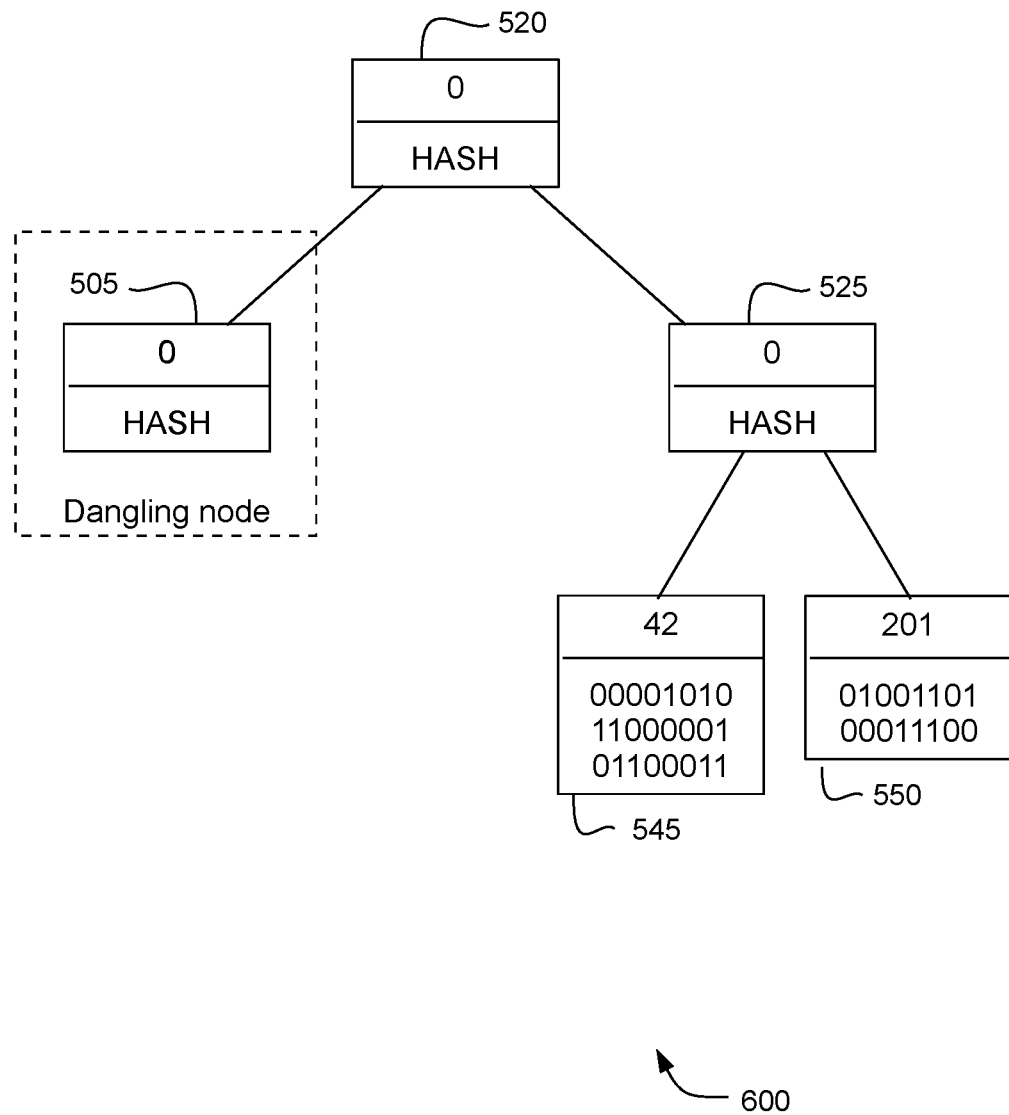
FIG. 6 is a block diagram illustrating the results of pruning a typed hash tree.

FIG. 6 is a block diagram illustrating the typed hash tree 600 that results from "pruning" the subtree 555 from the typed hash tree 500 of FIG. 5. "Pruning a subtree" means removing the descendants of the root of the subtree, without modifying the type or the label of the root of the subtree. The root of the subtree becomes a leaf node whose type is the distinguished type. Such a node is called a dangling node. In FIG. 6, node 505 is a dangling node.

The result of pruning a subtree from a first typed hash tree is a second typed hash tree that has the same root label as the first typed hash tree. On the other hand, assuming that the cryptographic hash function used to compute the labels of the internal nodes is collision and preimage resistant, if there are no dangling nodes or the labels of the dangling nodes have been generated at random, it is not possible to add leaf nodes to the tree or to modify the type or the label of any leaf node without changing the root label of the tree. As will become apparent below, it follows from this that the root label of a typed hash tree used in a rich credential can be viewed as an omission-tolerant cryptographic checksum of attributes and verification data included in the tree by the issuer.

Figure 7:
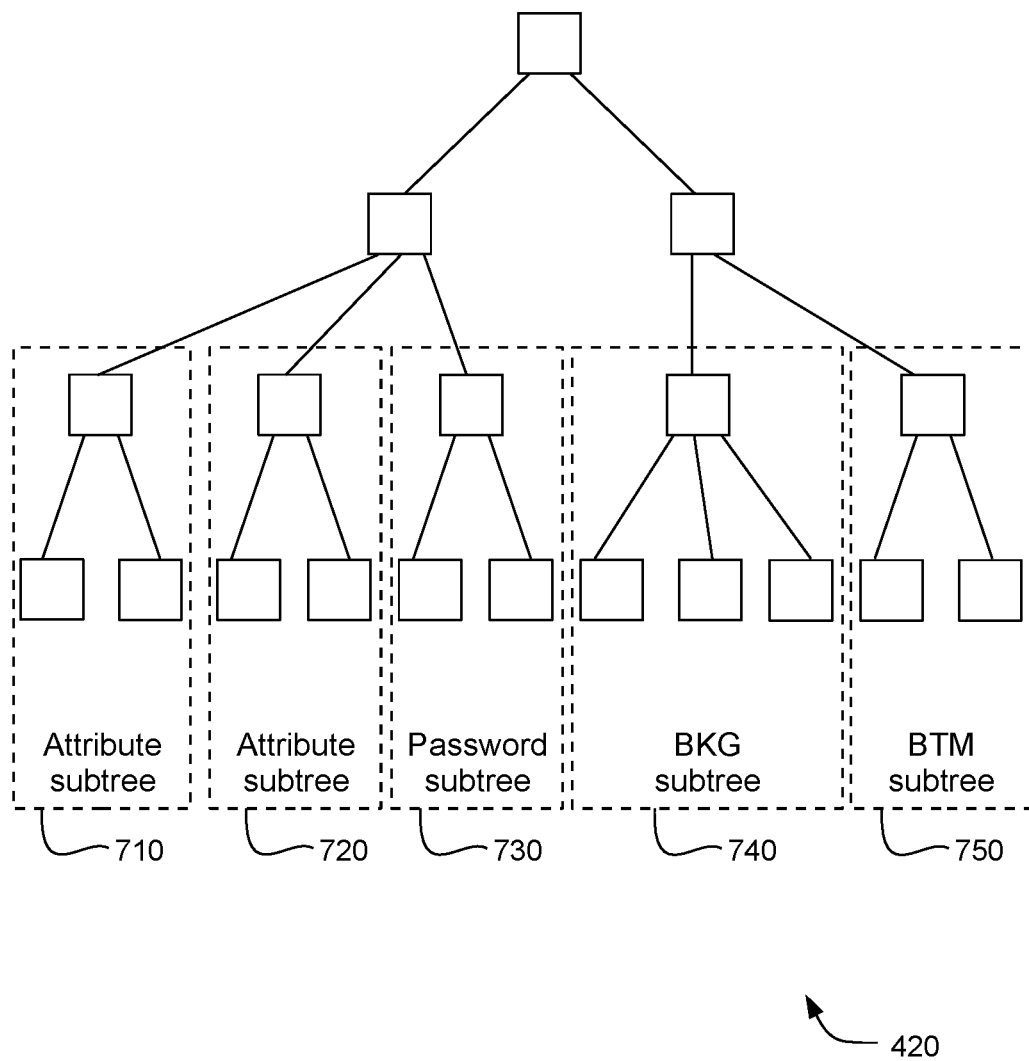
FIG. 7 is a block diagram illustrating a typed hash tree used in a rich certificate.

FIG. 7 is a block diagram showing an example of a typed hash tree used as the typed hash tree component 420 of the rich certificate component of a rich credential, according to some embodiments.

A typed hash tree used in a rich credential comprises: a root node; zero or more connecting nodes; and the following kinds of peripheral subtrees, discussed in more detail below in connection with FIGS. 10-13: (i) an "attribute subtree" for each attribute asserted by the rich credential; and (ii) a "verification-factor subtree" containing verification data for each verification factor supported by the rich credential besides the proof of knowledge of the private key. The verification subtrees include a "password subtree" containing verification data for verifying knowledge of the credential password and a "biometric subtree" for each biometric verification factor supported by the credential. A rich credential may support two kinds of biometric verification techniques: biometric key generation (BKG) and biometric template matching (BTM). Consequently there are two kinds of biometric subtrees: BKG subtrees and BTM subtrees. The example of FIG. 7 illustrates a rich credential comprising two attribute subtrees 710 and 720, a password subtree 730, a BKG subtree 740 and a BTM subtree 750.

In some embodiments the rich credential specification specifies the kinds of peripheral subtrees that may be present in the typed hash tree of a rich credential, including the attributes that may be asserted by the attributes subtrees and the biometric modalities that may be supported by the biometric subtrees, but does not require all kinds to be present and does not determine the relative positions of the peripheral subtrees, nor the number and arrangement of the zero or more connecting nodes. In those embodiments the verifier 150 identifies the different kinds of the subtrees that are present by the types of the nodes in each subtree.

In alternative embodiments the credential specification is supplemented by specification profiles for different use cases. Each profile may determine the number of subtrees that are present in a typed hash tree, their kinds, their relative arrangement, and the number and arrangement of the connecting nodes, if any. However, dangling nodes with random labels may be placed in the tree in lieu of subtrees of inapplicable attributes or unavailable biometric modalities.

Figure 8:
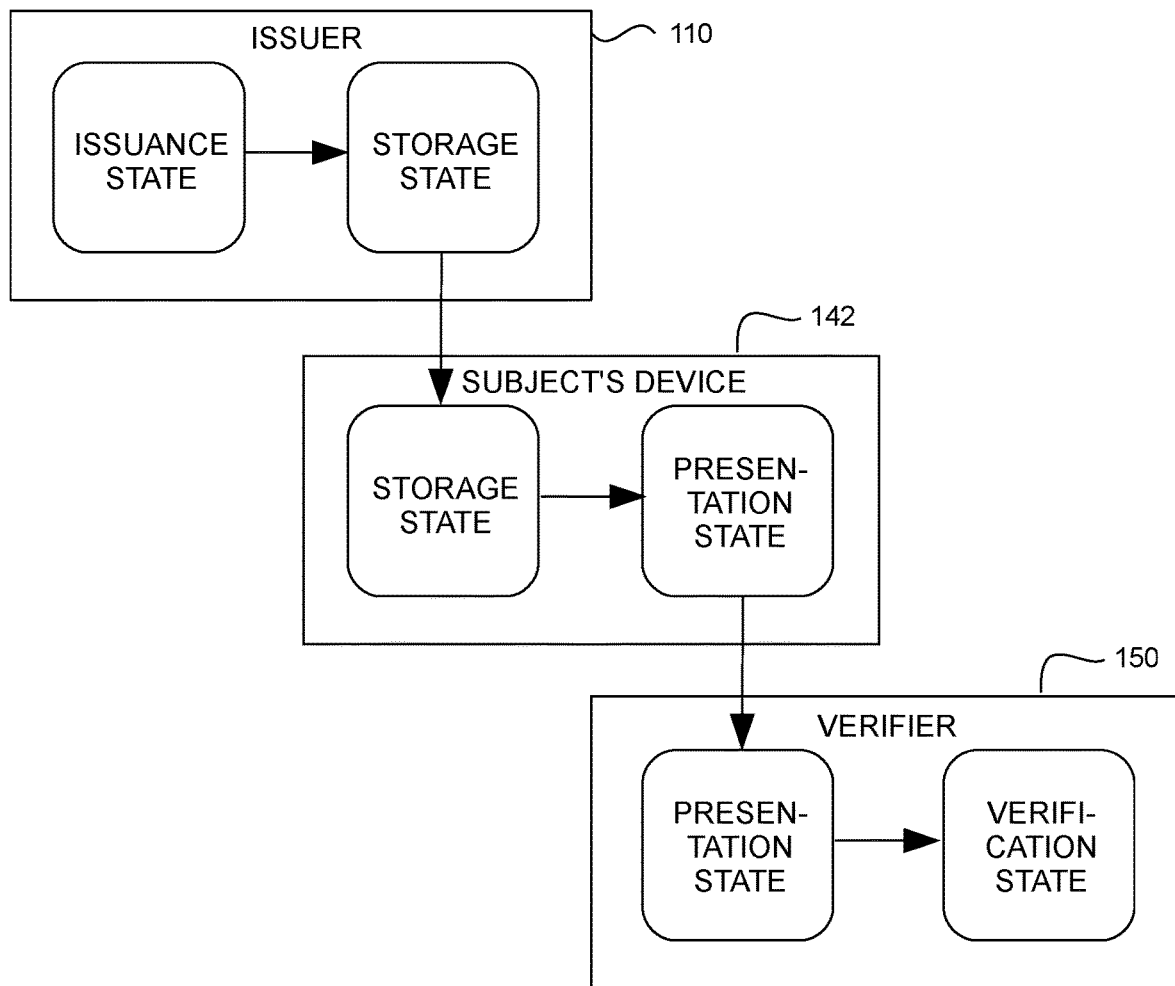
FIG. 8 is a block diagram illustrating the state transitions of a rich certificate.

As rich credential 120 is issued, stored, presented and verified, rich certificate 330 goes through several states, determined by corresponding states of its typed hash tree component 420. FIG. 8 illustrates those states and the transitions between them, according to some embodiments. The issuer 110 constructs the certificate in an issuance state, then transitions it to a storage state by omitting the labels of certain nodes, as described below in connection with FIGS. 11, 12 and 14, before delivering it to the credential procurement application 170 for storage in the primary computing device 142. Before presenting it to the verifier 120, the credential presentation application 180 transitions a copy of the rich certificate from the storage state to a presentation state by (i) pruning the attribute subtrees corresponding to the attributes not to be disclosed, and the verification-factor subtrees corresponding to the verification factors not to be presented, from the typed hash tree; and (ii) adding the HoCPaSS as the label of a password node of the password tree if the password tree is not being pruned, as further described below in connection with FIGS. 11 and 16. Because pruning a subtree does not change the root label of the typed hash tree, the transition to the presentation state does not invalidate the signature component 440 of the rich certificate. After receiving the certificate in the storage state, the verifier transitions it to a verification state by restoring the labels of certain nodes, as described below in connection with FIGS. 12 and 16, before validating it.

Figure 9:
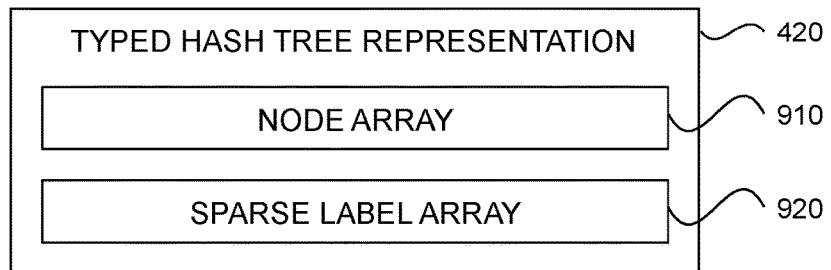
FIG. 9 is a block diagram illustrating the data structures used to represent the typed hash tree of a rich certificate.

FIG. 9 is a block diagram illustrating the data structures used to represent the typed hash tree component 420 of the rich certificate 330, according to some embodiments. Tree 420 is represented by two arrays, a node array 910 and a sparse label array 920.

(The term "sparse array" is used herein to refer to an array whose indices are not necessarily consecutive. A programming language such as JavaScript supports such arrays. In a programming language that does not directly support such arrays, a sparse array can be emulated by a hash table.)

The node array has an entry for each node of the tree, specifying the type and the number of children of the node. In the issuance state, the sparse label array also has an entry for each node of the tree, specifying the label of the node. Entries for the same node have the same index in both arrays. When the issuer 110 transitions the rich certificate to the storage state, it omits labels from certain nodes, as described below in connection with FIGS. 11, 12 and 14, by removing the entries for those nodes from the sparse label array. Entries of the sparse label array are removed without changing the indices of the remaining entries. When the credential presentation application 180 transitions a copy of the rich certificate to the presentation state by pruning peripheral subtrees, it removes the entries for the leaf nodes of those subtrees from both arrays, updating the indices of the arrays so that there are no gaps in the node array and entries for the same node have same indices in both arrays. The transition from the storage state to the presentation state also includes adding the HoCPaSS to the label array and the label of the above-mentioned password node of the password subtree, as further discussed below in connection with FIGS. 11 and 16. When the verifier 150 transitions the rich certificate from the presentation state to the verification state, it restores the labels of certain nodes, as described below in connection with FIGS. 12 and 16, by adding entries for those nodes to the label array.

In some embodiments, the nodes of the tree are listed in the arrays in depth-first post order. For example, the nodes of the typed hash tree 500 of FIG. 5 are listed in the order: 530, 535, 540, 505, 545, 550, 525, 520. This makes it easy to compute and add to the sparse label array the labels of the internal nodes, starting with the sparse label array containing only the labels of the leaf nodes, as follows. Initialize a stack to be empty. For each node, in the order in which the nodes are listed in the arrays: if the node is a leaf node, i.e. if the entry for the node in the node array indicates that it has no children, push the type of the node found in the node array and the label of the node found in the sparse label array to the stack; otherwise, if the entry for the node in the node array indicates that it has N children, pop the last 2×N entries from the stack (which comprise the types and labels of the N children of the node), compute the label of the node by applying a cryptographic hash function to a one-to-one encoding of the 2×N entries as specified in the credential specification, add the label of the node to the sparse label array, and push to the stack the type of the node found in the node array and the label of the node.

Figure 10:
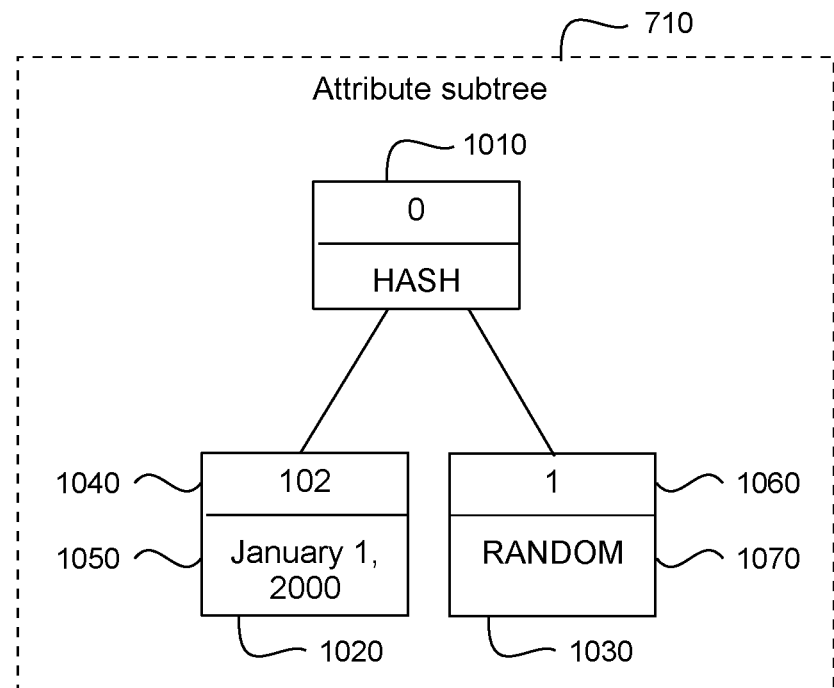
FIG. 10 is a block diagram illustrating a subtree of a typed hash tree of a rich certificate containing an attribute of the subject.

FIG. 10 is a block diagram showing the attribute subtree 710 of FIG. 7 in more detail. Subtree 710 comprises a peripheral node 1010 having as children an attribute node 1020 and a salt node 1030.

The type 1040 and label 1050 of attribute node 1020 specify the type and value of the attribute asserted by the node. In the example, the type is 102, assumed to be defined by the rich credential specification as referring to the birthdate of the subject, and the label is the subject's birthdate, shown as "Jan. 1, 2000" in the figure and encoded in the typed hash tree as a bit string in a manner specified by the rich credential specification.

The salt node 1030 has a type 1060 defined by the rich credential specification as the type of a salt node, that type being 1 in the example, and a random label 1070, indicated as "RANDOM" in the figure. A salt node is included in each peripheral subtree, with the purpose of protecting the contents of the subtree against a guessing attack by the verifier if the subtree is pruned from the typed hash tree when the credential is presented. If the peripheral subtree were pruned, the verifier would not see the attribute node 1020, but would see node 1010, which would be a dangling node after pruning. The verifier might guess that the pruned subtree is the birthdate attribute subtree, and would then have no difficulty in trying all possible values of the birthdate by hashing the encoding of type 102 and each possible value and comparing the result against the label of the dangling node.

Figure 11:
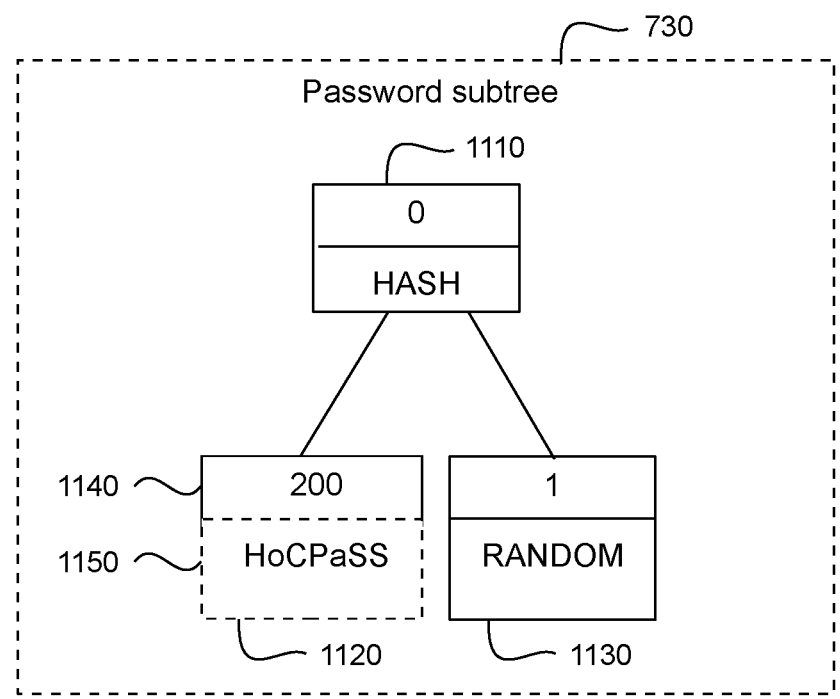
FIG. 11 is a block diagram illustrating a subtree of a typed hash tree of a rich certificate containing data for verifying knowledge of the credential password.

FIG. 11 is a block diagram showing the password subtree 730 of FIG. 7 in more detail. Subtree 730 comprises a peripheral node 1110 having as children a password node 1120 and a salt node 1130. The type 1140 of node 1120 is a type defined by the rich credential specification as identifying a password node, 200 in the example. The label 1150 of node 1120 is the HoCPaSS. Label 1150 is omitted from the sparse label array 920 in transition to the storage state, and restored in the presentation state if subtree 730 is not pruned. The omission of the label in the storage state is illustrated by a box with a dashed-line border in the figure.

Salt node 1130, like salt node 1030, has type 1 and a random label.

The term "biometric key generation (BKG)" is used herein to refer to any biometric verification technique where (i) at enrollment time, a helper datum and a biometric key are generated from an enrollment biometric sample and random bits, and (ii) at a later verification time, the biometric key is regenerated from the helper datum and a verification sample. The helper datum by itself is deemed not to reveal any useful biometric information about the subject. If the verification sample is genuine, i.e. if it comes from the same individual as the enrollment sample, the regenerated key is identical to the originally generated key with high probability.

Such techniques have also been called "revocable biometrics" because the biometric key can be revoked if compromised and a different key can be generated from a biometric sample coming from the same subject using different random bits. Other terminology that has been used in connection with such techniques includes "cancelable biometrics", "biometric key generation", "biometric cryptosystems", "fuzzy extractors", "fuzzy vaults", etc. Several such techniques have been described in the biometric literature. One technique is described in the Technical Report Number 640 of the Computer Laboratory of the University of Cambridge, entitled "Combining cryptography with biometrics effectively", by Feng Hao, Ross Anderson and John Daugman, dated July 2005. References to other techniques can be found in the survey article entitled "Biometric Template Security", by Anil K. Jain, Karthik Nandakumar and Abhishek Nagar, published in the EURASIP Journal on Advances in Signal Processing, volume 2008. Additional references can be found in the survey article entitled "A Survey on Biometric Cryptosystems and Cancelable Biometrics", by C. Rathgeb and A. Uhl, published in the EURASIP Journal on Advances in Signal Processing, volume 2011. Another such technique is described by Derakhshani et al. in U.S. Pat. No. 9,495,588, where the helper datum is called an "obfuscated template".

The term "biometric template matching (BTM)" is used herein to refer to any ordinary biometric verification technique where a biometric sample is matched at verification time against a biometric template derived from an enrollment sample at enrollment time without any randomization.

In the typed hash tree of a rich credential, a BKG subtree is used as verification data to support the use of a biometric modality for biometric verification by means of a BKG technique, while a BTM subtree is used as verification data to support the use of a biometric modality for biometric verification by means of a BTM technique.

Figure 12:
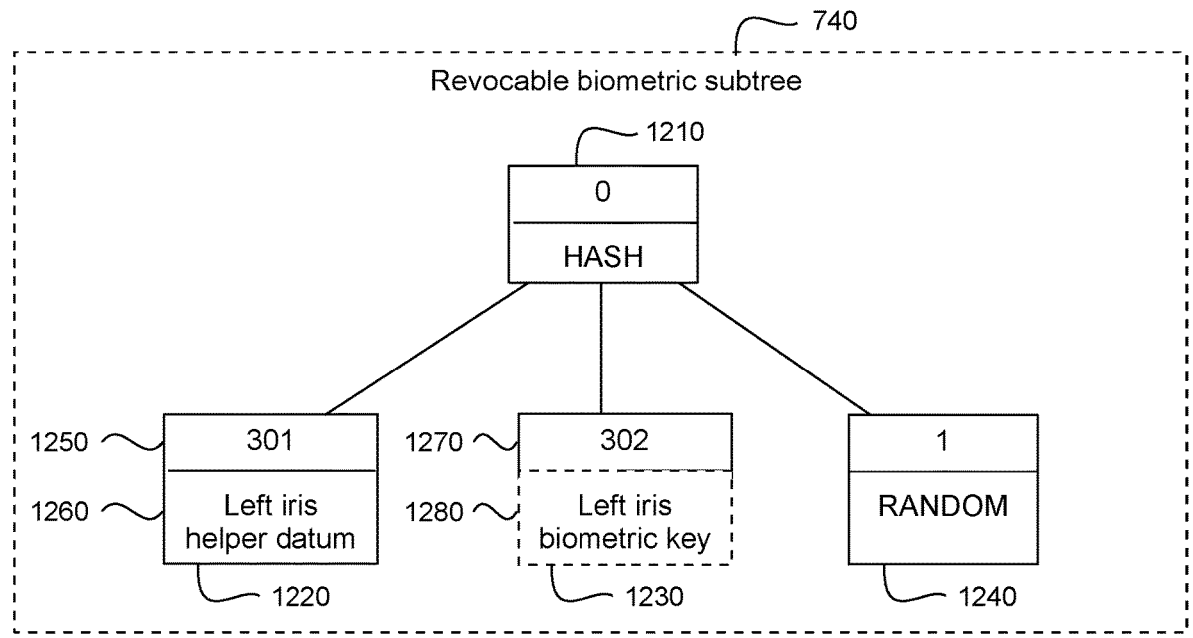
FIG. 12 is a block diagram illustrating a subtree of a typed hash tree of a rich certificate containing data for verifying a biometric sample using a biometric key generation technique.

FIG. 12 is a block diagram showing the BKG subtree 740 of FIG. 7 in more detail. In the example, subtree 740 is used as verification data to support the use of the left iris biometric modality for biometric verification by means of a BKG technique. Subtree 740 comprises a peripheral node 1210 having as children a helper datum node 1220, a biometric key node 1230 and a salt node 1240. The types 1250 and 1270 of nodes 1220 and 1230 are defined by the rich credential specification as identifying the helper datum and biometric key nodes, respectively, of the left iris biometric modality. In the example, those types are 301 and 302. The labels 1260 and 1280 of nodes 1220 and 1230 are the helper datum and biometric key generated from an image of the left iris of the subject at enrollment time. Label 1280 is omitted from the sparse label array 920 in the transition to the storage state and restored in the verification state if subtree 740 has not been pruned. The omission of the label in the storage state is illustrated by a box with a dashed-line border in the figure.

Salt node 1240, like other salt nodes, has type 1 and a random label.

Figure 13:
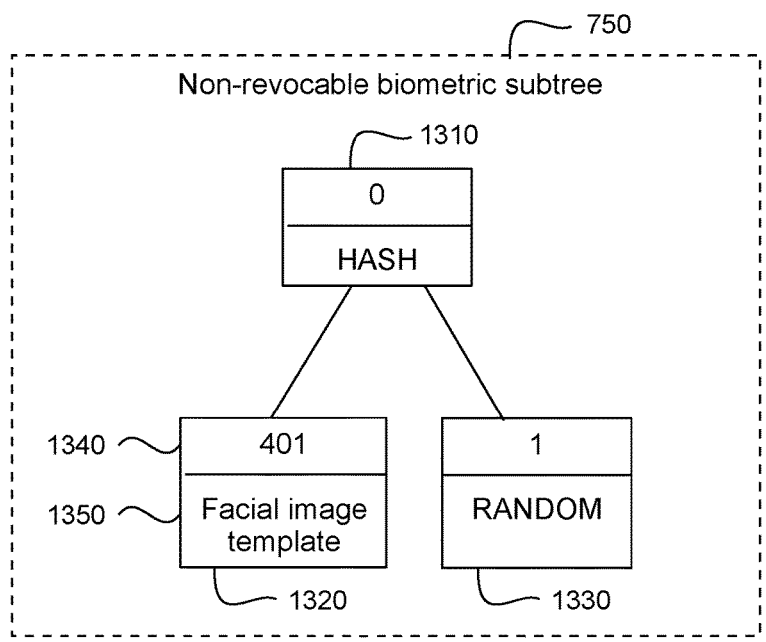
FIG. 13 is a block diagram illustrating a subtree of a typed hash tree of a rich certificate containing a biometric template.

FIG. 13 is a block diagram illustrating the BTM subtree 750 of FIG. 7. In the example, subtree 750 is used as verification data to support the use of the facial verification biometric modality for biometric verification by means of an ordinary BTM technique. Subtree 750 comprises a peripheral node 1310 having as children a template node 1320 and a salt node 1330. The type 1340 of node 1320, 401 in the example, is the type defined by the rich credential specification as identifying the template node of the facial image modality. The label 1350 of node 1320 is the facial image template derived at enrollment type from a facial image of the subject. Salt node 1330, like other salt nodes, has type 1 and a random label.

Figure 14:
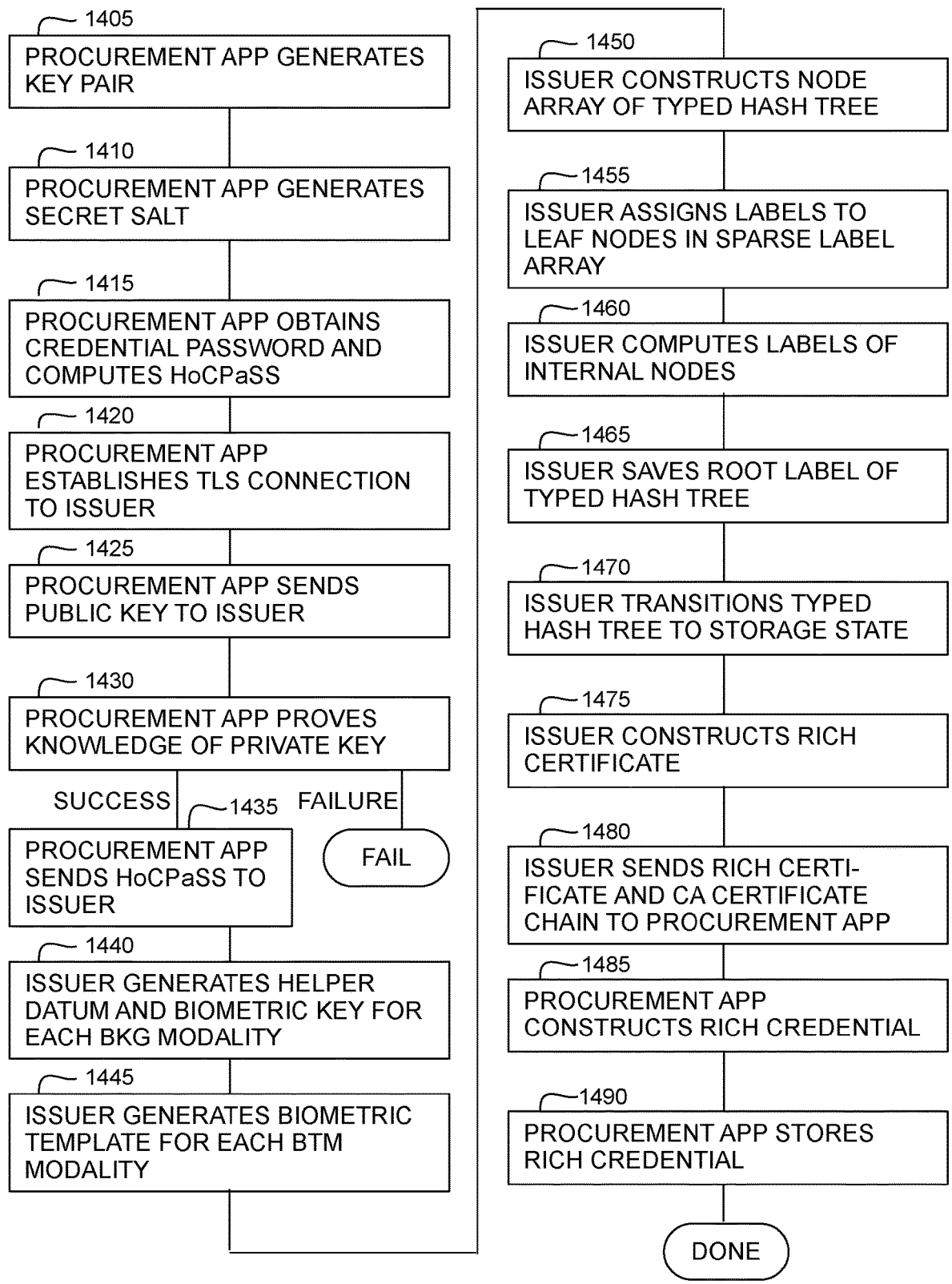
FIG. 14 is a flow diagram of a process for issuing a rich credential.

FIG. 14 is a flow diagram of the issuance process 1400 carried out at step 210 of process 200 by the issuer 110 and the credential procurement application 170 with the purpose of issuing the rich credential 120 to the subject 130, according to some embodiments. Prior to issuance: (i) the issuer has obtained the attributes of the subject to be included in the credential; (ii) the issuer has determined the biometric modalities to be supported by the rich credential using BKG techniques, and obtained biometric samples from the subject for those biometric modalities; (iii) the issuer has determined the biometric modalities to be supported by the rich credential using BTM techniques, and obtained biometric samples from the subject for those biometric modalities; and (iv) the subject and the issuer have established a means for the subject to authenticate to the issuer, such as two-factor authentication or presentation of a high entropy security code provided by the issuer to the subject for that purpose.

At 1405 the credential procurement application 170 generates a key pair pertaining to a digital signature public key cryptosystem, whose components will become the private key 310 of the rich credential and the public key 410 of the rich certificate 330 of the rich credential. Then the process continues at 1410.

At 1410 the credential procurement application generates a random high entropy bit string that will serve as the secret salt 320 of the rich credential. Then the process continues at 1415.

At 1415 the credential procurement application obtains the credential password from the subject and computes the HoCPaSS from the credential password and the secret salt generated at 1410. Then the process continues at 1420.

At 1420 the credential procurement application establishes a TLS connection to the issuer on behalf of the subject, with mutual authentication between the issuer and the subject. The issuer authenticates to the subject during the TLS handshake by sending its TLS server certificate and proving knowledge of the associated private key. The subject authenticates to the issuer after the handshake, by the subject authentication means established prior to issuance. Then the process continues at 1425.

At 1425 the credential procurement application sends the public key component of the key pair generated at 1405 to the issuer over the secure connection. Then the process continues at 1430.

At 1430 the credential procurement application and the isssuer execute a protocol over the TLS connection, shown below in FIG. 17, by which the credential procurement application proves knowledge of the private key associated with the public key sent at 1425, which is the private key component of the key pair generated at 1405. The protocol may succeed or fail. If it fails, process 1400 fails. If it succeeds, process 1400 continues at 1435.

At 1435 the credential procurement application sends the HoCPaSS to the issuer over the TLS connection. Then the process continues at 1440.

At 1440, for each biometric modality to be supported using a BKG technique, the issuer generates a helper datum and a biometric key from the biometric sample obtained prior to issuance for that modality. Then the process continues at 1445.

At 1445, for each biometric modality to be supported using a BTM technique, the issuer derives a biometric template from the biometric sample obtained prior to issuance for that modality. Then the process continues at 1450.

At 1450 the issuer constructs the node array 910 of the typed hash tree 420 of the rich certificate, with entries for the following nodes: the root node, zero or more connecting nodes, and the nodes of the following peripheral subtrees: (i) an attribute subtree for each of the attributes of the subject obtained by the issuer prior to issuance; (ii) a password subtree; (iii) a BKG subtree for each biometric modality to be supported using a BKG technique, if any; and (iv) a BTM subtree for each biometric modality to be supported using a BTM technique, if any. In some embodiments, if a specification profile requires an attribute or biometric subtree to be present and the corresponding attribute or biometric sample has not been obtained by the issuer, a dangling node with a random label is included in lieu of the required subtree. Then the process continues at 1455.

At 1455 the issuer initializes the sparse label array 920 of the typed hash tree as an empty array, and assigns labels to nodes of the tree by adding entries to the sparse label array, as follows: (i) it assigns a random bit string as the label of each salt node; (ii) it assigns bit string encodings of the subject's attributes as the labels of the attribute nodes; (iii) it assigns the HoCPaSS as the label of the password node; (iv) it assigns the helper datum and biometric key generated at step 1440 for each biometric modality to be supported by a BKG technique as the labels of the helper datum node and biometric key node of the corresponding BKG subtree; and (v) it assigns the biometric template derived at step 1445 for each biometric modality to be supported by a BTM technique as the label of the template node of the corresponding BTM biometric subtree. Then the process continues at 1460.

At 1460 the issuer computes the labels of the internal nodes and adds them to the sparse label array as described above in connection with FIG. 9. Then the process continues at 1465.

At 1465, the issuer saves the root label of the typed hash tree by copying it from the entry for the root node in the sparse label array to a memory location. Then the process continues at 1470.

At 1470 the issuer transitions the typed hash tree to the storage state by removing the following entries from the sparse label array: (i) the entry for the root node; (ii) the entries for the connecting nodes, if any; (iii) the entries for the root nodes of the attribute trees; (iv) the entries for the root nodes of the BTM subtrees; (v) the entry for the password node; and (vi) the entries for the biometric key nodes, if any. Then the process continues at 1475.

At 1475 the issuer constructs the rich certificate 330 as follows: (i) it assembles the components of the typed hash tree 420, comprising the node array 910 and the sparse label array 920; (ii) it determines and assembles the components of the metadata 430, comprising the version number 431, the serial number 432, the validity period 433, the issuer ID 434, the signature cryptosystem ID 435, the issuer key ID 436, the URL of the CRL distribution point 437 and the URL of the OCSP server 438; (iii) it computes the signature 440 on the public key, the metadata and the root label of the typed hash tree saved at 1465; and (iv) it assembles the components of the rich certificate, comprising the public key, the typed hash tree, the metadata and the signature. Then the process continues at 1480.

At 1480 the issuer sends the rich certificate to the credential procurement application over the TLS connection, along with a standard CA certificate chain backing the rich certificate. The certificate chain is empty if the CA that operates the issuer 110 is a root CA, whose public keys, one of which is identified by the issuer key ID 436, are well known. Otherwise the first certificate in the chain contains the public key to be used for verifying the rich certificate, and each subsequent certificate, if any, contains the public key to be used for verifying the previous certificate, the last certificate in the chain being issued by a root CA and verifiable by a well known public key of the root CA. Then the process continues at 1485.

At 1485 the credential procurement application constructs the rich credential 120 by assembling its components, comprising the private key component of the key pair generated at 1405, which becomes the private key component 310 of the rich credential, the secret salt generated at 1410, which becomes the secret salt component 320 of the rich credential, the rich certificate received at 1480, which becomes the rich certificate 330 of the rich credential, and the certificate chain also received at 1480, which becomes the certificate chain component 340 of the rich credential. Then the process continues at 1490.

At 1490, the credential procurement application stores the rich credential 120 in the primary computing device 142.

Figure 15:
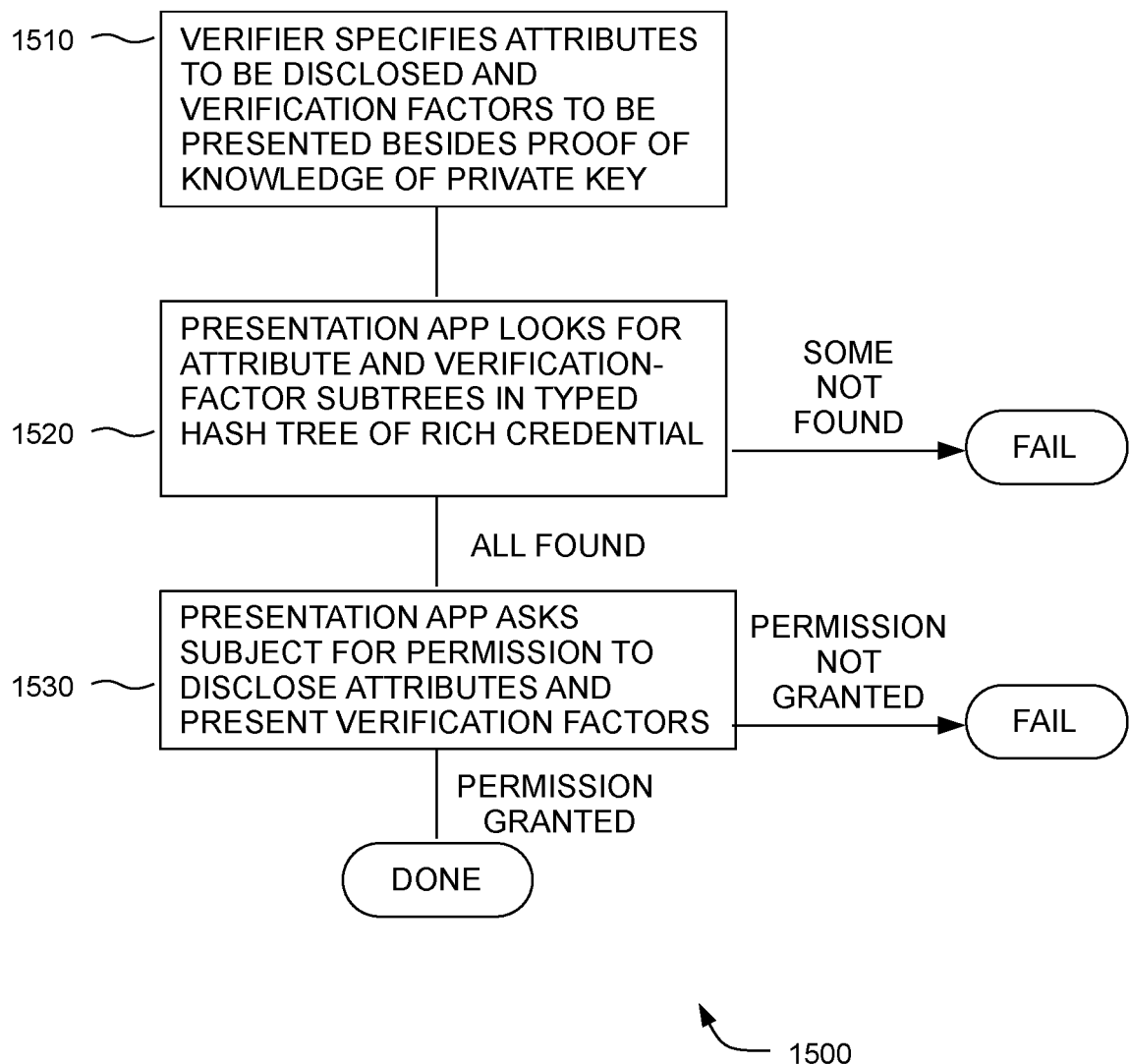
FIG. 15 is a flow diagram of a process for negotiating the attributes to be disclosed and the verification factors to be presented during the presentation of a rich credential.

FIG. 15 is a flow diagram of the negotiation process 1500 carried out at step 220 of process 200 between the verifier 150 and the credential presentation application 180.

At 1510 the verifier specifies the attributes to be disclosed and the verification factors to be presented besides proof of knowledge of the private key component of the rich credential, i.e. whether proof of knowledge of the credential password must be presented, which biometric samples are to be presented for biometric verification by means of BKG techniques, if any, and which biometric samples are to be presented for biometric verification by means of BTM techniques, if any. Then the process continues at 1520.

At 1520 the credential presentation application 180 checks whether the typed hash tree 420 of the rich certificate 330 of the rich credential 120 stored in the primary computing device 142 includes an attribute subtree for each of the attributes required to be disclosed by the verifier, and a verification-factor subtree for each of the verification factors required to be presented to the verifier. If it does not, the process fails. If it does, the process continues at 1530.

At 1530 the credential presentation application asks the subject for permission to disclose the required attributes and present the required verification factors to the verifier. If the subject does not grant permission, the process fails. If it does, the process terminates successfully.

Figure 16:
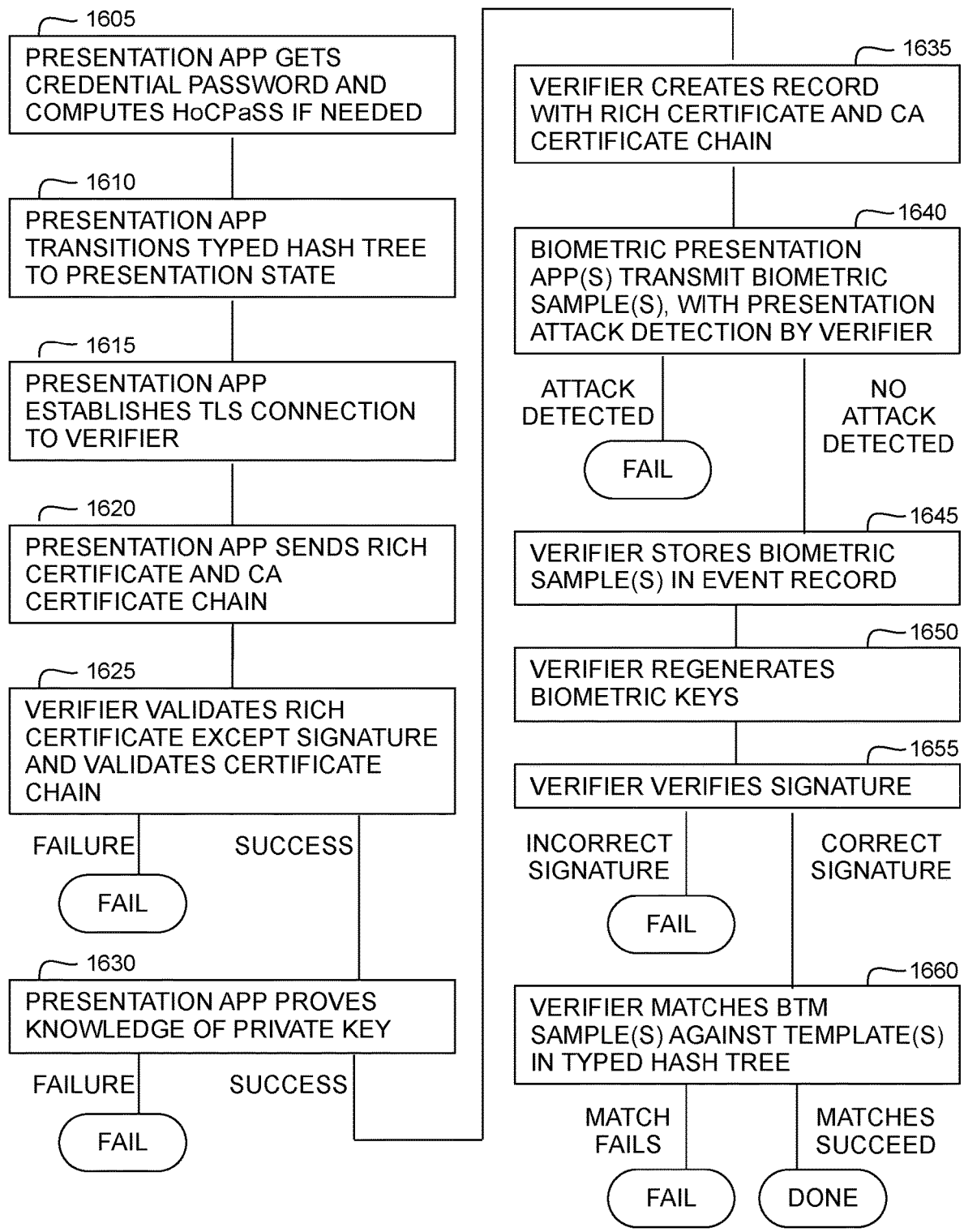
FIG. 16 is a flow diagram of a process for presenting a rich credential together with biometric samples to be verified against the rich credential.

FIG. 16 is a flow diagram of a presentation process 1600 carried out at step 230 of process 200 by the verifier 150, the credential presentation application 180 running on the primary computing device 142 and one or more biometric presentation applications running on the ancillary computing device 144 by which the rich credential 120 is presented to the verifier, with disclosure of the attributes and presentation of the verification factors agreed upon at step 220 of process 200, according to some embodiments.

At step 1605 of process 1600, the credential presentation application checks whether knowledge of the credential password is one of the verification factors to be presented. If so, it prompts the subject for the credential password and computes the HoCPaSS from the credential password supplied by the subject and the secret salt 310 of the rich credential. Then the process continues at 1610.

At 1610 the credential presentation application transitions a copy of the rich certificate component 330 of the rich credential to the presentation state and sends the copy in the presentation state to the verifier. The credential presentation application transitions the copy to the presentation state by modifying the typed hash tree as follows: (i) for each attribute that need not be disclosed, computing the label of the root node of the corresponding attribute subtree and adding it to the sparse label array, then pruning the attribute subtree; (ii) if knowledge of the credential password is among the verification factors to be presented, removing the label of the root node of the password subtree from the sparse label array and adding the HoCPaSS to the array as the label of the password node; (iii) if knowledge of the password is not among the verification factors to be presented, pruning the password subtree; (iv) for each BKG verification factor to be presented, removing the label of the root node of the corresponding BKG subtree from the sparse label array; (iv) for each BKG verification factor that need not be presented, pruning the corresponding BKG subtree; and (v) for each BTM verification factor that need not be presented, computing the label of the root node of the corresponding BTM subtree and adding then it to the sparse label array, then pruning the subtree. The root label of the typed hash tree is the same in the presentation state as it was in the storage state; therefore the transition to the storage state does not invalidate the signature 440 on the public key, the metadata and the root label of the typed hash tree. Then the process continues at 1615.

At 1615 the credential presentation application establishes a TLS connection to the verifier. The verifier authenticates to the credential presentation application by sending its TLS server certificate during the TLS handshake and proving knowledge of the associated private key. Then the process continues at 1620.

At 1620 the credential presentation application sends the copy of the rich certificate that was transitioned to the presentation state at 1610 to the verifier, as well as the CA certificate chain component 340 of the rich credential. Then the process continues at 1625.

At 1625 the verifier validates the certificate chain received at 1620, and partially validates the rich certificate by inspecting the presentation-state copy received at 1620, checking if the rich certificate has expired or been revoked, but not verifying the signature in the certificate yet. If the validations fail, process 1600 fails. Otherwise it continues at 1630.

At 1630 the credential presentation application and the verifier execute a protocol over the TLS connection, shown below in FIG. 17, by which the credential presentation application proves knowledge of the private key associated with the public key component 410 of the rich certificate, which is present in the presentation-state copy received by the verifier at 1620, the associated private key being the private key component 310 of the rich credential stored in the primary computing device. The protocol may succeed or fail. If it fails, process 1600 fails. If it succeeds, process 1600 continues at 1635.

At 1635 the verifier creates an identification event record where it stores the presentation-state copy of the rich certificate and the CA certificate chain that it received at 1620, together with a security code for the record, by which the record can be located. Then the process continues at 1640.

At 1640 the verifier transmits the security code to the credential presentation application, which prompts the subject 130 to transmit a biometric sample to the verifier along with the security code, for each of the biometric verification factors to be presented, if any. For each biometric verification factor to be presented, the subject uses a biometric presentation application such as biometric presentation application 148 running on the ancillary computing device 144 to transmit a biometric sample obtained by a sensor such as sensor 146, in a manner that allows the verifier to perform presentation attack detection, including liveness verification and replay detection. The biometric presentation application also transmits the security code for the identification event record, which is entered by the subject into the biometric presentation application or obtained by the biometric presentation application from the credential presentation application via Bluetooth or by reading a QR code displayed by the credential presentation application on a display of the primary computing device.

In alternative embodiments to those illustrated in FIG. 1, the biometric presentation application 148 runs on the primary computing device 142, the sensor 146 is located on the primary computing device, and the verifier itself launches the biometric presentation application, passing to it the security code, instead of relying on the subject to do so. In some of these alternative embodiments the primary computing device 142 is a mobile device running a mobile operating system, the verifier 150 is a web server accessed by the subject via a mobile web browser running on the mobile device, and the verifier launches the biometric presentation application by means of a Hypertext Transfer Protocol (HTTP) Redirect response with a status such as 302 or 303 to an HTTP POST request that transmits the presentation-state copy of the rich certificate and the CA certificate chain at 1620, which targets a URL with a custom scheme that is handled by the biometric presentation application, with the security code embedded in the URL. In some other of the alternative embodiments in which the biometric presentation application and the sensor are located on the primary computing device, the primary computing device is a traditional personal computer such as a desktop or a laptop running a traditional operating system, the verifier is a web server accessed by the subject via a traditional web browser running on the traditional personal computer, and the verifier launches the biometric presentation application by an HTTP Success response with a 200 status and a content-type header that specifies a Multipurpose Internet Mail Extensions (MIME) type that is handled by the biometric presentation application, with the security code embedded in the body of the response.

Methods of presentation attack detection with liveness verification and replay detection are known in the art for various biometric modalities. In one such method for the facial image modality, the subject is asked to submit a live video of his/her face while reading a random sequence of digits sent to the subject as a challenge by the verifier. The verifier uses lip reading to verify that the challenge sequence is being read.

If the verifier detects a presentation attack, process 1600 fails. Otherwise it continues at 1645.

At 1645 the verifier stores the biometric samples that it has received at 1640, if any, in the identification event record, using the security code received with each of the samples to locate the record. Then the process continues at 1650.

At 1650, for each BKG biometric sample present in the identification event record, if any, the verifier regenerates a biometric key from the sample and the label of the helper datum node of the corresponding BKG subtree of the typed hash tree 420 of the presentation-state copy of the rich certificate received at 1620, and adds the regenerated biometric key to the sparse label array 920 as the label of the biometric key node of the corresponding BKG subtree of the typed hash tree. At the conclusion of step 1650, the rich certificate is held by the verifier in the verification state and the sparse label array contains the labels of the leaf nodes. After step 1650, the process continues at 1655.

At 1655 the verifier computes computes the labels of the internal nodes and adds them to the sparse label array as described above in connection with FIG. 9, then verifies the signature 440 of the rich certificate on the public key 410, the metadata 430 and the root label of the typed hash tree, which it finds in the sparse label array as the entry for the root node. If the verification of the signature fails, process 1600 fails. Otherwise it continues at 1660.

At 1660 the verifier matches each BTM biometric sample received present in the identification event record against the label of the template node of the corresponding BTM subtree of the typed hash tree. If any matching fails, process 1600 fails. Otherwise process 1600 terminates successfully.

Figure 17:
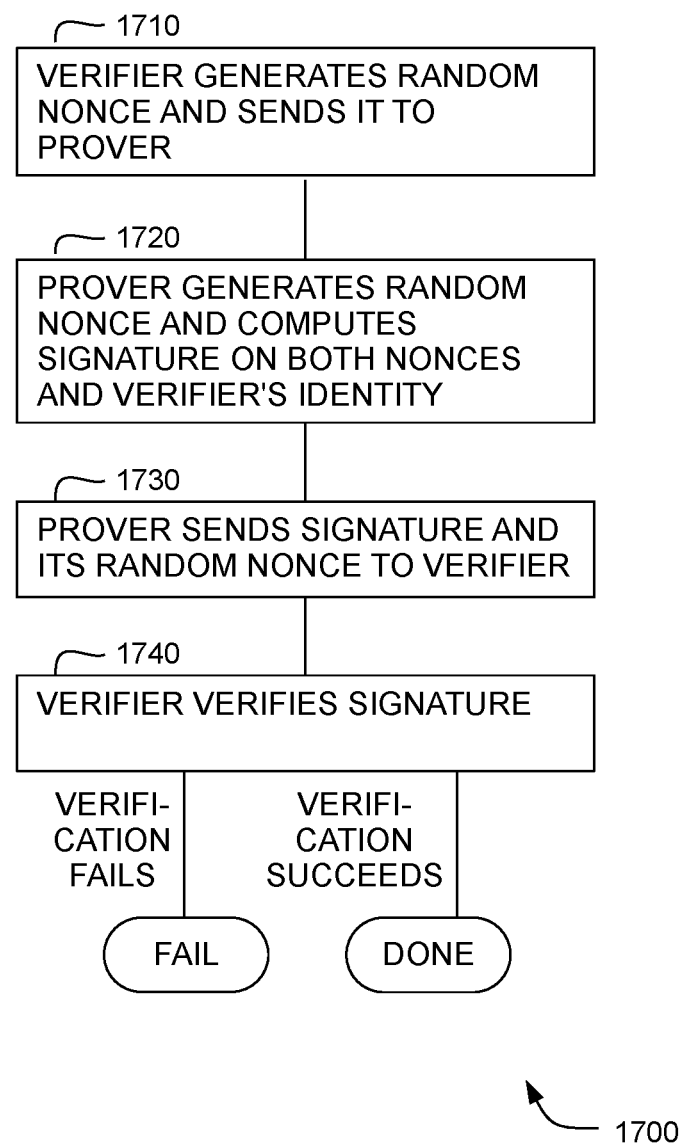
FIG. 17 is a flow diagram of a process for proving knowledge of a private key.

FIG. 17 is a flow diagram illustrating a process 1700 for executing a protocol by which a prover proves knowledge of a private key pertaining to a digital signature cryptosystem such as DSA, ECDSA or RSA to a verifier, after the prover has established a TLS connection to the verifier, after the verifier has authenticated itself during the TLS handshake by sending an identifier such as a Domain Name System (DNS) domain name within its TLS server certificate and proving knowledge of the private key associated with the certificate, and after the verifier has become in possession of the public key associated with the private key whose knowledge is to be proved by the prover. The protocol is used at step 1430 of process 1400, where the prover is the credential procurement application 170 and the verifier is the issuer 110 of FIG. 1, and at step 1630 of process 1600, where the prover is the credential procurement application 180 and the verifier is the verifier 150 of FIG. 1.

At 1710 the verifier generates a random nonce and sends it to the prover over the TLS connection. Then the process continues at 1720.

At 1720 the prover generates its own random nonce and computes a signature on the two nonces and the identifier found in the TLS server certificate of the verifier, using the private key associated with the public key held by the verifier. Then the process continues at 1730.

At 1730 the prover sends the signature and its random nonce to the verifier. Then the process continues at 1740.

At 1740 the verifier attempts to verify the signature. If verification fails, process 1700 fails. If it succeeds, process 1700 terminates successfully.

Figure 18:
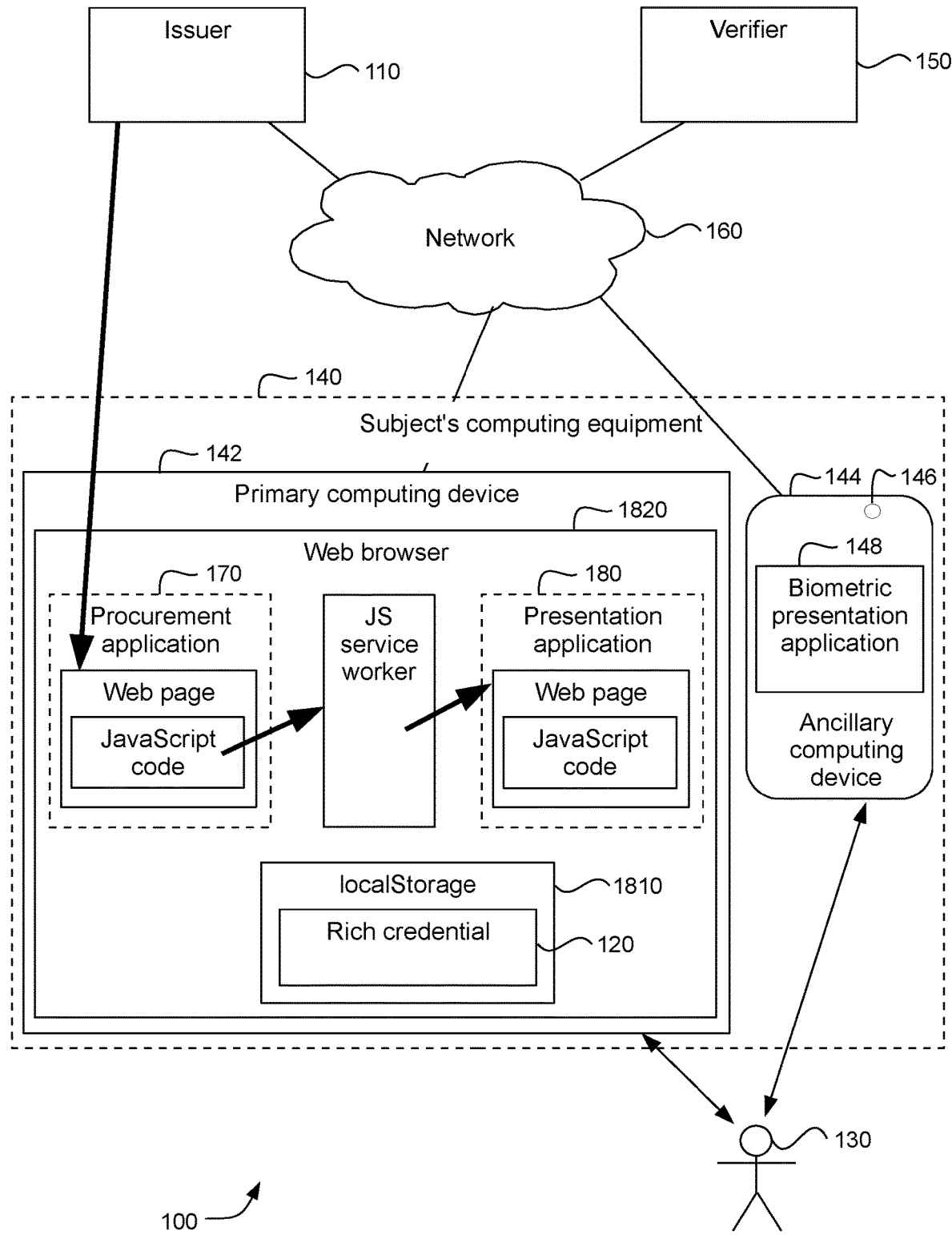
FIG. 18 is a block diagram of a system where a rich credential is stored in persistent browser storage.

FIG. 18 is a block diagram showing further details of system 100 in some embodiments where the rich credential 120 is stored in a persistent storage 1810 known as "local Storage" made accessible to JavaScript code embedded in web pages by a web browser 1820 running in the primary computing device 142. In those embodiments the issuer 110 and the verifier 150 are web servers that are accessed by the subject 130 via the browser. The credential procurement application 170 is a web page with embedded JavaScript code, which has been downloaded from the issuer 110 and rendered by the browser. At step 1490 of process 1400, the JavaScript code of the credential procurement application encodes the rich credential as a JavaScript string and stores it as the value of a property of the localStorage object. Then the JavaScript code of the credential procurement application registers a JavaScript service worker with the browser, configured to intercept HTTP requests from the browser to the issuer and respond to them without involvement by the issuer. Later, at presentation time, the request that triggers step 1510 of the negotiation process 1500 is an HTTP request from the browser to the verifier, and step 1510 is implemented as an HTTP Redirect response with a status such as 302 or 303, which triggers an HTTP request from the browser to the issuer. The request to the issuer is intercepted by the service worker, which responds by dynamically generating a web page with embedded JavaScript code that is rendered by the browser as if it had been downloaded from the issuer. That web page with its embedded JavaScript code plays the role of the credential presentation application 180 in the rest of the negotiation process 1500 and in the presentation process 1600. The rich credential is retrievable from local Storage by the JavaScript code of the credential presentation application because it has the same web origin as the issuer, but is inaccessible to JavaScript code with a different origin.

Figure 19:
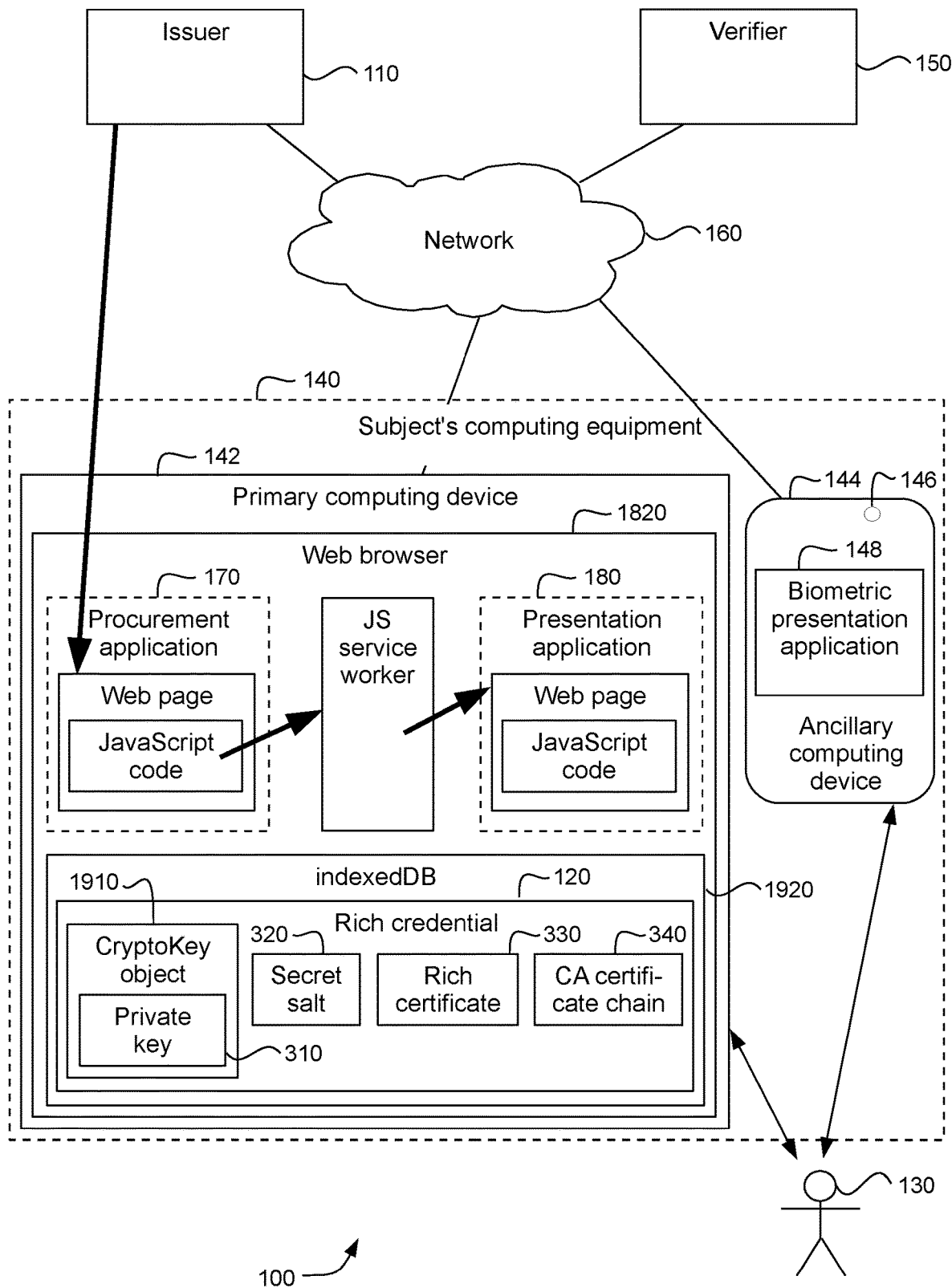
FIG. 19 is a block diagram of a system where a rich credential is stored in persistent browser storage and the private key component of the rich credential is inside a CryptoKey object from which it cannot be extracted by JavaScript code.

FIG. 19 is a block diagram showing further details of system 100 in embodiments that differ from those of FIG. 18 in that the private key component 310 of the rich credential 120 is contained in a CryptoKey object 1910 from which it cannot be extracted by JavaScript code running in the browser, whether of the same origin as the issuer or a different origin.

The key pair of step 1405 of process 1400 is generated by a call to the "generateKey" method of the "SubtleCrypto" interface of the Web Cryptography API, specifying ECDSA or RSASSA-PKCS1-v1_5 as the "algorithm" (i.e. the cryptosystem) of the key pair. The call to generateKey produces (via a JavaScript "promise") two CryptoKey objects, one containing a private key, the other containing a public key. The public key is extracted from its CryptoKey object for use as the public key component 410 of the rich certificate 330 of the rich credential. The private key, however, is marked as not extractable, and is kept inside its CryptoKey object 1910, which is itself placed inside the rich credential as illustrated in the figure. The signature of step 1720 of the process 1700 that is used to prove knowledge of the private key 310 of the rich credential at steps 1430 of process 1400 and step 1630 of process 1600 is then computed by a call to the "sign" method of the "SubtleCrypto" interface of the Web Cryptography API that takes the CryptoKey object 1910 as an argument.

A CryptoKey object cannot be converted to a string for storage in "local Storage". Hence the rich credential 120 containing the CryptoKey object 1910 that itself contains the private key 310 is stored instead in another persistent storage 1920 known as "indexedDB", also provided by the browser 1820.

The embodiments illustrated by FIG. 19 are otherwise like those illustrated by FIG. 18.

Some embodiments in which the rich credential 120 is stored in local Storage or contained in a CryptoKey object that is stored in indexedDB differ from those illustrated in FIGS. 18 and 19 in that a biometric presentation application 148 that transmits a biometric sample to the verifier and the sensor 146 that obtains the sample are located in the primary computing device 142 rather than an ancillary device. In such embodiments the biometric presentation application 148 is launched by the verifier as described above after the description of step 1640 of process 1600.

Although specific embodiments have been illustrated and described herein, it will be appreciated by those of ordinary skill in the art that a variety of alternate and/or equivalent implementations may be substituted for the specific embodiments shown and described without departing from the scope of the present invention. This application is intended to cover any adaptations or variations of the specific embodiments discussed herein.

What is claimed is:

1. A method of identifying a subject to a verifying server over a network, comprising the steps of:
  issuing, by an issuing server, a rich credential to the subject, the rich credential comprising a secret portion and a disclosable portion, the secret portion comprising a private key, the disclosable portion comprising a rich certificate, the rich certificate comprising a typed hash tree and a public key associated with the private key, the typed hash tree having a root label and a plurality of subtrees, the rich certificate further comprising a signature computed on data including the public key and the root label;
  transitioning, by a credential presentation application, the rich certificate from a storage state to a presentation state, the transitioning including pruning one or more subtrees of the typed hash tree without invalidating the signature;
  sending, by the credential presentation application, the rich certificate in the presentation state to the verifying server over the network;
  proving, by the credential presentation application, knowledge of the private key to the verifying server;
  and verifying, by the verifying server, the signature.

2. The method of claim 1, wherein at least one of the plurality of subtrees is an attribute subtree containing an attribute node labeled by an attribute and a salt node labeled by a random salt.

3. The method of claim 1 wherein at least one of the plurality of subtrees is a password subtree containing a password node and the transitioning from the storage state to the presentation state includes assigning a datum dependent on a password as a label of the password node, the method further comprising the credential presentation application obtaining the password from the subject and computing the password-dependent datum from the password.

4. The method of claim 3, wherein the secret portion of the rich credential comprises a secret salt and the password-dependent datum is a hash of the password and the secret salt.

5. The method of claim 3, wherein the password subtree further comprises a salt node labeled by a random salt.

6. The method of claim 1 wherein at least one of the plurality of subtrees is a biometric template matching subtree containing a biometric template node labeled by a biometric template, the method further comprising:
   a biometric presentation application presenting a biometric sample to the verifying server; and
   the verifying server matching the biometric sample against the biometric template.

7. The method of claim 6, further comprising:
   the verifying server performing presentation attack detection on the presentation of the biometric sample.

8. The method of claim 1, wherein at least one of the plurality of subtrees is a biometric key generation subtree containing a biometric key node and a helper datum node labeled by a biometric helper datum, the method further comprising:
   a biometric presentation application submitting a biometric sample to the verifying server;
   the verifying server generating a biometric key from the biometric sample and the biometric helper datum; and
   the verifying server assigning the biometric key as a label of the biometric key node.

* * * * *

UNITED STATES PATENT AND TRADEMARK OFFICE
CERTIFICATE OF CORRECTION

PATENT NO. : 10,567,377 B2  
APPLICATION NO. : 15/468100  
DATED : February 18, 2020  
INVENTOR(S) : Lewison et al.

Page 1 of 1

It is certified that error appears in the above-identified patent and that said Letters Patent is hereby corrected as shown below:

On the Title Page

Item (73), The name of the Assignee should be changed to: Pomian & Corella, LLC

Signed and Sealed this
Thirty-first Day of August, 2021

Drew Hirshfeld
*Performing the Functions and Duties of the*
*Under Secretary of Commerce for Intellectual Property and*
*Director of the United States Patent and Trademark Office*